(12) United States Patent
Nagarajan et al.

(10) Patent No.: US 10,922,970 B2
(45) Date of Patent: Feb. 16, 2021

(54) METHODS AND SYSTEMS FOR FACILITATING DRIVING-ASSISTANCE TO DRIVERS OF VEHICLES

(71) Applicant: ANI Technologies Private Limited, Bengaluru (IN)

(72) Inventors: Sathya Narayanan Nagarajan, Bengaluru (IN); Nishant Kumar, Dhanbad (IN); Harshit Sharma, East Vinod Nagar (IN); Achal Gupta, Ghaziabad (IN); Sacheth Kadam, Bengaluru (IN)

(73) Assignee: ANI Technologies Private Ltd., Bengaluru (IN)

( * ) Notice: Subject to any disclaimer, the term of this patent is extended or adjusted under 35 U.S.C. 154(b) by 0 days.

(21) Appl. No.: 16/552,081

(22) Filed: Aug. 27, 2019

(65) Prior Publication Data

US 2020/0090510 A1 Mar. 19, 2020

(30) Foreign Application Priority Data

Sep. 14, 2018 (IN) .............................. 201841034614

(51) Int. Cl.
*G08G 1/0967* (2006.01)
*G07C 5/08* (2006.01)
*G08G 1/01* (2006.01)
*B60Q 9/00* (2006.01)

(52) U.S. Cl.
CPC ......... *G08G 1/096775* (2013.01); *B60Q 9/00* (2013.01); *G07C 5/0816* (2013.01); *G07C 5/0866* (2013.01); *G08G 1/0125* (2013.01)

(58) Field of Classification Search
CPC . G08G 1/096; G08G 1/01; G08G 1/20; G07C 5/08; G06Q 40/00; G06Q 40/02; G06Q 40/04; B60W 50/08
See application file for complete search history.

(56) References Cited

U.S. PATENT DOCUMENTS

| | | | |
|---|---|---|---|
| 8,686,844 B1 * | 4/2014 | Wine | G08G 1/20 340/439 |
| 9,141,582 B1 * | 9/2015 | Brinkmann | G07C 5/0808 |
| 9,574,888 B1 * | 2/2017 | Hu | G01C 21/3461 |
| 9,783,159 B1 * | 10/2017 | Potter | G08B 25/00 |
| 9,786,154 B1 * | 10/2017 | Potter | G08B 21/02 |
| 9,805,601 B1 * | 10/2017 | Fields | G06Q 40/08 |
| 9,919,648 B1 | 3/2018 | Pedersen | |
| 9,972,054 B1 * | 5/2018 | Konrardy | B60W 50/0205 |
| 10,024,684 B2 * | 7/2018 | Wang | G08G 1/0141 |

(Continued)

FOREIGN PATENT DOCUMENTS

WO WO-2017145693 A1 8/2017

*Primary Examiner* — Hoi C Lau
(74) *Attorney, Agent, or Firm* — Chip Law Group

(57) ABSTRACT

Methods and systems for assisting a driver of a vehicle traversing on a route are provided. Sensor and image data are received from each vehicle associated with the route. The sensor and image data are processed to generate driving-assisting features. Environmental and fleet data associated with the route are further retrieved from data sources. The environmental and fleet data are further processed to generate driving-assisting features. A warning message is generated based on the driving-assisting features. The warning message is communicated to each driver for facilitating driving-assistance in real-time.

20 Claims, 10 Drawing Sheets

(56) References Cited

U.S. PATENT DOCUMENTS

| | | | |
|---|---|---|---|
| 10,102,587 B1* | 10/2018 | Potter | B60R 25/102 |
| 10,185,998 B1* | 1/2019 | Konrardy | G06Q 40/08 |
| 10,319,039 B1* | 6/2019 | Konrardy | G06Q 40/08 |
| 10,467,824 B2* | 11/2019 | Rosenbaum | G01M 17/007 |
| 10,490,078 B1* | 11/2019 | Fields | G08G 1/0129 |
| 10,698,421 B1* | 6/2020 | Harris | G05D 1/0289 |
| 10,726,493 B1* | 7/2020 | Kyne | G06Q 40/08 |
| 10,762,786 B1* | 9/2020 | Dewey | B62D 15/0265 |
| 2006/0265117 A1* | 11/2006 | Cahoon | B60R 25/045 |
| | | | 701/114 |
| 2008/0200209 A1* | 8/2008 | Cahoon | B60R 25/24 |
| | | | 455/557 |
| 2011/0106381 A1* | 5/2011 | Filev | B60W 50/08 |
| | | | 701/40 |
| 2011/0187520 A1* | 8/2011 | Filev | B60W 40/09 |
| | | | 340/438 |
| 2011/0254676 A1* | 10/2011 | Marumoto | G07C 5/085 |
| | | | 340/441 |
| 2011/0304447 A1* | 12/2011 | Marumoto | G07C 5/085 |
| | | | 340/438 |
| 2014/0365029 A1* | 12/2014 | Sugimoto | B60W 40/09 |
| | | | 701/1 |
| 2015/0019266 A1* | 1/2015 | Stempora | G06Q 40/08 |
| | | | 705/4 |
| 2015/0025917 A1* | 1/2015 | Stempora | G06K 9/0061 |
| | | | 705/4 |
| 2015/0092056 A1 | 4/2015 | Rau et al. | |
| 2015/0133164 A1* | 5/2015 | Song | H04W 4/046 |
| | | | 455/456.3 |
| 2015/0356635 A1* | 12/2015 | Thurston | B60Q 9/00 |
| | | | 705/306 |
| 2016/0061625 A1* | 3/2016 | Wang | G08G 1/012 |
| | | | 701/454 |
| 2016/0086285 A1* | 3/2016 | Jordan Peters | G08G 1/096827 |
| | | | 705/4 |
| 2017/0309092 A1* | 10/2017 | Rosenbaum | G01M 17/007 |
| 2018/0154870 A1 | 6/2018 | Kurata | |
| 2018/0283897 A1* | 10/2018 | Wang | G08G 1/0141 |
| 2018/0299284 A1* | 10/2018 | Wang | G01C 21/3694 |

\* cited by examiner

METHODS AND SYSTEMS FOR FACILITATING DRIVING-ASSISTANCE TO DRIVERS OF VEHICLES

CROSS-RELATED APPLICATIONS

This application claims priority of Indian Application Serial No. 201841034614, filed Sep. 14, 2018, the contents of which are incorporated herein by reference.

FIELD OF THE INVENTION

The present invention relates generally to driving-assistance systems, and, more particularly, to methods and systems for facilitating driving-assistance to drivers of vehicles in real-time driving environment.

BACKGROUND

With the popularization of passenger vehicles to the general public, road accidents are one of the major safety concerns as they cause humongous damages to lives and properties. The major causes of the road accidents include driver inattention, irregular road conditions, unpredictable weather conditions, or the like. Road safety, thus, becomes paramount and it is necessary to take proper measures to avoid the road accidents. The road safety is especially a big concern for vehicle service providers who earn their bread and butter by facilitating on-demand vehicle services to passengers. Accidents or delays during trips can result in the passengers refraining from using the vehicle services provided by the vehicle service providers. Since drivers are at fault for the majority of the road accidents, several attempts are currently being taken to avoid the road accidents and improve the road safety. One continuous attempt is to assist the drivers during driving of their vehicles. Therefore, it becomes important to ensure that a driver is attentive while driving a vehicle and is provided with all necessary information, such as real-time road and weather conditions, to ensure a safe driving.

A conventional approach to assist the driver of the vehicle includes processing in-vehicle data obtained from in-vehicle sensors installed in the vehicle. The in-vehicle data is used to monitor health of the vehicle and driver behavior of the driver. While this approach assists the driver during the driving, there is immense room for improvement.

In light of the foregoing, there exists a need for a technical and more reliable solution that overcomes the above-mentioned problems and improves the current implementation of driving-assistance that can facilitate effective and efficient driving-assistance to a driver of a vehicle in real-time.

SUMMARY

One embodiment of the present invention provides a vehicle device of a vehicle for assisting a driver of the vehicle traversing on a route. The vehicle device is communicatively coupled with a set of sensors and a set of image-capturing devices installed with the vehicle. The vehicle device includes circuitry configured to receive sensor data and image data from each vehicle of first and second sets of vehicles associated with the route. The circuitry receives the sensor data by way of the set of sensors installed in each vehicle, and the image data by way of at least first and second image-capturing devices installed with each vehicle. The circuitry is further configured to process the sensor and image data to generate first and second sets of driving-assisting features, respectively. The first set of driving-assisting features is indicative of real-time traffic conditions, real-time road conditions, speed-time-distance attributes, braking-and-acceleration frequency, and health conditions of each vehicle. The first set of driving-assisting features is further indicative of driving patterns of each driver of each vehicle. The second set of driving-assisting features is indicative of vision-based real-time traffic conditions, weather conditions, road conditions, and driving behavior of each driver.

The circuitry is further configured to retrieve environmental data from a first data source and fleet data from a second data source. The environmental data includes at least one of meteorological data and road data associated with the route along which the driver is driving the vehicle. The fleet data includes at least one of accident data, safety-response-ticket data, and passenger feedback data of each vehicle of the first and second sets of vehicles. The fleet data further includes vehicle maintenance data of each vehicle of the second set of vehicles. The circuitry is further configured to process the environmental and fleet data to generate third and fourth sets of driving-assisting features, respectively. The third set of driving-assisting features is indicative of environmental conditions and accident-prone zones of the route. The fourth set of driving-assisting features is indicative of accident patterns, vehicles' health conditions, drivers' risk profiles, and accident location and time of each accident associated with the route. The circuitry is further configured to generate a warning message based on at least one of the first, second, third, and fourth sets of driving-assisting features and alert the driver of the vehicle in real-time.

Another embodiment of the present invention provides a method and a system for assisting a driver of a vehicle in real-time. The method includes one or more operations that are executed by circuitry of a server, such as a data collector, a data processor, and a notification generator, for assisting the driver of the vehicle. The data collector receives sensor and image data from each vehicle of first and second sets of vehicles. The sensor data includes at least one of location data, proximity data, gyroscope data, accelerometer data, and on-board diagnostic (OBD) data. The data collector receives the sensor data by way of a set of sensors installed in each vehicle and the image data by way of at least first and second image-capturing devices installed with each vehicle. The set of sensors includes at least one of a location sensor, a proximity sensor, a gyroscope sensor, an accelerometer sensor, and an OBD sensor. The first image-capturing device is oriented to face inside of each vehicle for capturing inside-vehicle objects and the second image-capturing device is oriented to face outside of each vehicle for capturing outside-vehicle objects. The first and second sets of vehicles are associated with a route along which the driver is driving the vehicle. Further, the first and second sets of vehicles are connected to a service platform that is facilitated by a vehicle service provider for offering on-demand vehicle services to passengers in a geographical region including the route. The vehicle is from one of the first and second sets of vehicles. Further, each vehicle of the first set of vehicles is owned by an individual (such as a corresponding driver) and each vehicle of the second set of vehicles is owned by the vehicle service provider and is provided to a corresponding driver for operating on the service platform for providing the on-demand vehicle services to the passengers.

The data processor processes the sensor and image data to generate first and second sets of driving-assisting features, respectively. The first set of driving-assisting features is indicative of real-time traffic conditions, real-time road conditions, speed-time-distance attributes, braking-and-acceleration frequency, and health conditions of each vehicle along with driving patterns of each driver of each vehicle. The second set of driving-assisting features is indicative of vision-based real-time traffic conditions, weather conditions, road conditions, and driving behavior of each driver. Each of the first and second sets of driving-assisting features is further indicative of a proximity distance of each outside-vehicle object with respect to the vehicle. An outside-vehicle object corresponds to at least one of a pedestrian, an animal, a road-divider, a non-driveable area, a rock, or any other vehicle.

The data collector further retrieves environmental data from a first data source, and fleet data from a second data source. The environmental data includes at least one of meteorological data and road data associated with the route. The fleet data includes at least one of accident data, safety-response-ticket data, and passenger feedback data for each vehicle of the first and second sets of vehicles. The fleet data further includes vehicle maintenance data of each vehicle of the second set of vehicles. The data processor further processes the environmental and fleet data to generate third and fourth sets of driving-assisting features, respectively. The third set of driving-assisting features is indicative of environmental conditions and accident-prone zones of the route. The fourth set of driving-assisting features is indicative of accident patterns, vehicles' health conditions, drivers' risk profiles, and accident location and time of each accident associated with the route.

The data processor further determines a risk score for the vehicle based on at least one of the first, second, third, and fourth sets of driving-assisting features. The notification generator generates a warning message based on at least one of the first, second, third, and fourth sets of driving-assisting features and alerts the driver of the vehicle in real-time. The warning message may be generated when the risk score is greater than a threshold value. The warning message may be indicative of at least one of a forward collision warning, a headway distance warning, a road condition warning, an accident-prone zone warning, an over speeding warning, or a distracted driver warning. The notification generator communicates the warning message to the driver in real-time. The warning message may be communicated to the driver by means of at least one of a text signal, an audio signal, a video signal, or a haptic signal.

Thus, the method and the system of the present invention provide driving-assistance to the driver of the vehicle based on data (such as the sensor and image data) collected from the vehicle as well as data (such as the sensor and image data) collected from other vehicles which are in the vicinity of the vehicle and/or are traversing along the same route along which the driver is driving the vehicle. Various other types of data are also collected from various data sources (such as the first and second data sources) and are processed to generate driving insights for providing the driving-assistance to the driver. Such real-time driving-assistance of the driver includes communicating real-time warning messages based on the collected data, thereby providing a higher degree of the driving-assistance to the driver as compared to conventional driving-assistance approaches. Thus, the driving-assistance methods and systems of the present invention help in reducing road accidents and contribute towards saving of lives and properties. Furthermore, the driving-assistance methods and systems provide more efficient, more accurate, and more comprehensive way of assisting the driver of the vehicle in real-time. Such real-time driving-assistance may further be utilized to manage and control a ride time of each ride, and thus optimize the overall trip time for each driver or passenger, which in turn may improve the overall ride experience of each driver or passenger during the ride.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice-versa.

Figure 1:
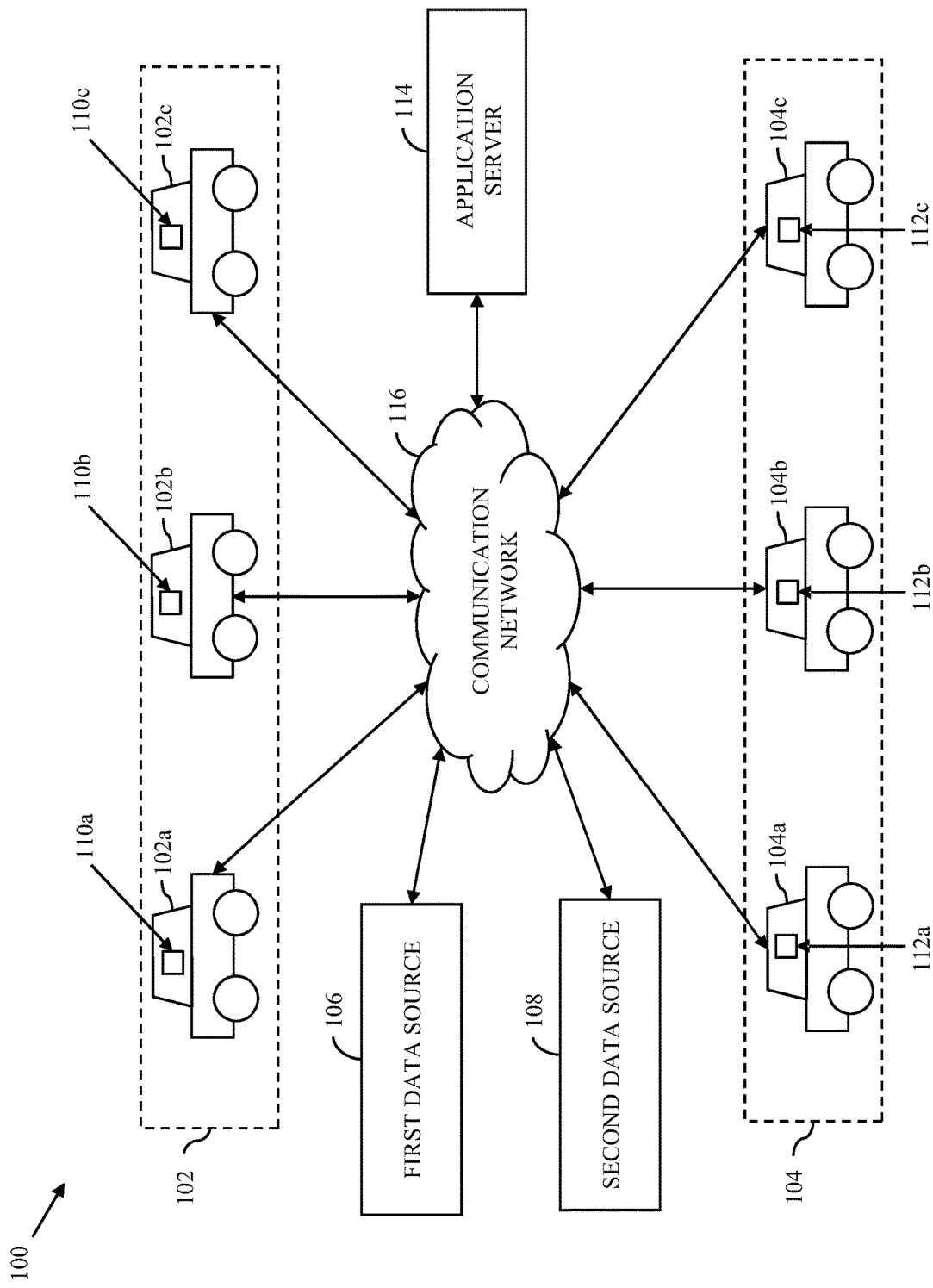
FIG. 1 is a block diagram that illustrates an environment in which various embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for facilitating driving-assistance to drivers of vehicles in real-time driving environment. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Terms Description (in Addition to Plain and Dictionary Meaning)

Vehicle is a means of transport that is deployed by a vehicle service provider to provide on-demand vehicle services to passengers. For example, the vehicle is an automobile, a bus, a car, a bike, and the like. The passengers may travel in the vehicle to commute between their source and destination locations.

Sensor data is data that represents any event or change in environment that has been detected or measured by a sensor. The sensor data may include location data, proximity data, gyroscope data, accelerometer data, on-board diagnostic (OBD) data, or the like.

Location data is data that represents position information of a component (e.g., an electronic device or a mechanical device) that has been detected or measured by a location sensor associated with the component. In one example, the location data represents real-time position information of a vehicle. The location data is collected from the location sensor installed in the vehicle. The location sensor may be an absolute position sensor or a relative one (i.e., a displacement sensor). Further, the location sensor may be designed to measure linear positions, angular positions, multi-axis positions, or a combination thereof.

Proximity data is data that represents presence of one or more nearby objects. The proximity data is collected from a proximity sensor. In one example, the proximity sensor is installed in a vehicle for detecting the one or more nearby objects and measuring a proximity distance of each nearby object (such as a pedestrian, an animal, another vehicle, or the like) with respect to the vehicle. The proximity sensor may be installed at a front end, a rear end, or a side end of the vehicle.

Gyroscope data is data that represents angular velocity of a component (e.g., an electronic device or a mechanical device) that is collected from a gyroscope sensor installed inside the component. In one example, the gyroscope sensor may be installed inside a vehicle and may be configured to measure the angular velocity of the vehicle. The gyroscope data may be used to determine and maintain an orientation of the vehicle.

Accelerometer data is data that represents acceleration of a moving object. In one example, the accelerometer data is collected from an accelerometer sensor installed in a vehicle that indicates the acceleration of the vehicle. The acceleration is a physical acceleration experienced by the vehicle relative to a free-fall. The accelerometer data is used to determine an orientation of the vehicle. The accelerometer data is also used in airbag deployment.

OBD data is data that represents various in-operation status and information of a vehicle. The OBD data may be collected from an OBD sensor that is installed inside the vehicle for monitoring vehicle health and driving conditions. The OBD sensor may a single sensor or a group of sensors that is operable to detect and measure the various in-operation status and information, such as pedal position, airflow rate, coolant temperature, emission status, tire pressure, braking frequency, fuel level, vehicle temperature, speed of the vehicle, or the like.

Image data is data that represents pixel information of an object captured by an image-capturing device. The image data may include one or more images and videos captured by the image-capturing device installed with a vehicle. The image data may be used to monitor behavior of a driver of the vehicle, road conditions associated with a route along which the driver is driving the vehicle, weather conditions associated with the route, or the like. The image data may further be used to identify one or more objects that are in the vicinity of the vehicle. Further, the image data may be used to determine a distance of each object from the vehicle.

Image-capturing device is an optical instrument for recording or capturing images. The images may be individual still photographs or sequences of images constituting videos. In one example, the image-capturing device may be installed with a vehicle to capture an image or video of an object in the vicinity of the vehicle. For example, the image-capturing device, oriented to face inside the vehicle, captures images and videos of inside-vehicle objects. Similarly, the image-capturing device, oriented to face outside the vehicle, captures images and videos of outside-vehicle objects.

Inside-vehicle objects are objects that are present inside a vehicle. Examples of the inside-vehicle objects include a driver, one or more passengers, one or more seats, steering wheel, gear-box, or the like. Images and videos of the inside-vehicle objects captured by image-capturing devices may be used to determine driver behavior, passenger behavior, vehicle condition, or the like.

Outside-vehicle objects are objects that are present outside a vehicle. Examples of the outside-vehicle objects include one or more pedestrians, animals, other vehicles, road signs, buildings, trees, or the like. Images and videos of the outside-vehicle objects captured by image-capturing devices may be used to determine vision-based real-time traffic conditions, weather conditions, and road conditions along with proximity of each outside-vehicle object with respect to the vehicle. The images and videos of the outside-vehicle objects may also be used to determine driving behavior of drivers of other vehicles that are in front of, back of, or side of the vehicle.

Safety-response-ticket data is data that represents unnatural and suspicious behavior of a driver associated with a vehicle. The safety-response-ticket data may be generated based on passenger feedback data provided by passengers or sensor and image data. The safety-response-ticket data may be used to alert respective authorities of a misdemeanor of the driver.

Driving-assisting features are features that are used to facilitate driving-assistance to a driver of a vehicle. The driving-assisting features may be indicative of real-time traffic conditions, health conditions of various vehicles, driving behavior of various drivers, or the like.

Vehicle service provider is a service provider (e.g., a cab service provider such as OLA) that offers on-demand vehicle services to passengers in a geographical region. The vehicle service provider facilitates a service platform on which drivers of various vehicles and passengers connect themselves to provide or avail the on-demand vehicle services. The various vehicles operating on the service platform may be owned by their respective drivers or by the vehicle service provider. In one example, the service platform receives a request from a passenger for an on-demand vehicle service, and thereafter allocates a vehicle from available vehicles to service the passenger request. In another example, an individual (e.g., a driver of a vehicle) is connected to the service platform for only receiving driving-assistance features during driving of the vehicle. In such a scenario, the driver may not use the vehicle for offering any vehicle service to other passengers.

FIG. 1 is a block diagram that illustrates an environment 100 in which various embodiments of the present invention are practiced. The environment 100 includes vehicles 102a-102c (collectively referred to as, "a set of vehicles 102") and vehicles 104a-104c (collectively referred to as, "a set of vehicles 104"). Each of the vehicles 102a-102c and 104a-104c is associated with a driver, for example, the vehicle 102a is associated with a first driver, the vehicle 102b is associated with a second driver, the vehicle 102c is associated with a third driver, the vehicle 104a is associated with a fourth driver, the vehicle 104b is associated with a fifth driver, and the vehicle 104c is associated with a sixth driver. The environment 100 further includes data sources 106 and 108, vehicle devices 110a-110c and 112a-112c installed in the vehicles 102a-102c and 104a-104c, respectively, and an application server 114.

In an embodiment, the sets of vehicles 102 and 104, the data sources 106 and 108, the vehicle devices 110a-110c and 112a-112c, and the application server 114 communicate with each other by way of a communication network 116. Examples of the communication network 116 include, but are not limited to, a wireless fidelity (Wi-Fi) network, a light fidelity (Li-Fi) network, a satellite network, the Internet, a mobile network such as a cellular data network, a high-speed packet access (HSPA) network, or any combination thereof.

An objective of the present invention is to assist a driver of a moving vehicle traversing from one location to another location. For example, the driver is traversing from a home location to a work location along a route connecting at least the home location and the work location, or vice-versa. In another example, the driver is transporting passengers from their source locations to their destination locations along one or more routes connecting their source and destination locations. The sets of vehicles 102 and 104 are operating in a geographical region including the route connecting the source and destination locations. The sets of vehicles 102 and 104 are connected to a platform facilitated by a vehicle service provider (e.g., a cab service provider such as OLA) that offers on-demand vehicle services to one or more passengers (hereinafter, "passengers") in the geographical region. In an embodiment, the moving vehicle is one of the vehicles 102a-102c having the corresponding vehicle device installed in it, and the driver is one of the first through third drivers. In another embodiment, the moving vehicle is one of the vehicles 104a-104c having the corresponding vehicle device installed in it, and the driver is one of the fourth through sixth drivers. For the sake of ongoing description, it is being assumed that the moving vehicle is the vehicle 104a with the vehicle device 112a installed in it and the driver of the moving vehicle (i.e., the vehicle 104a) is the fourth driver. However, it will be apparent to a person skilled in the art that the process for assisting any driver associated with the platform (e.g., the first, second, third, fifth, or sixth driver) is similar to the process for assisting the fourth driver without limiting the scope of the present invention. Further, the driver along with her vehicle may be connected to the platform for earning her livelihood by offering the on-demand vehicle services to the passengers by means of the vehicle service provider, or for self-use where the driver will not use her vehicle for offering the on-demand vehicle services but will continue to receive driving-assistance in real-time driving environment.

A vehicle (such as the vehicle 102a, 102b, 102c, 104a, 104b, or 104c) is a means of transport that is deployed by the vehicle service provider to provide the on-demand vehicle services to the passengers. Examples of the vehicle include, but are not limited to, an automobile, a bus, a car, and a bike. The vehicle may be associated with one of various categories of vehicles facilitated by the vehicle service provider for offering the on-demand vehicle services to the passengers. In one example, the vehicle is a micro-category vehicle, i.e., a compact hatchback vehicle. In another example, the vehicle is a mini-category vehicle, i.e., a regular hatchback vehicle. In yet another example, the vehicle is a prime-category vehicle, i.e., a prime sedan vehicle, a prime play vehicle, a prime sport utility vehicle (SUV), or a prime executive vehicle. In yet another example, the vehicle is a lux-category vehicle, i.e., a luxury vehicle In an exemplary embodiment, the vehicles 102a-102c are owned by the first through third drivers, respectively. The vehicles 104a-104c are owned by the vehicle service provider and are provided to the corresponding driver (e.g., the fourth through sixth drivers) for operating on the platform facilitated by the vehicle service provider. Each of the vehicles 102a-102c and 104a-104c has a set of sensors installed in it. The set of sensors may include at least one of a location sensor (shown in FIG. 2), a proximity sensor (shown in FIG. 2), a gyroscope sensor (shown in FIG. 2), an accelerometer sensor (shown in FIG. 2), an on-board diagnostic (OBD) sensor (shown in FIG. 2), or the like. The set of sensors of each vehicle generates sensor data and communicates the sensor data to at least one of the vehicle devices 110a-110c and 112a-112c (e.g., the vehicle device 112a of the vehicle 104a) or the application server 114, either directly or by means of intermediate communication devices (such as the vehicle devices 110a-110c and 112a-

112c). The sensor data may include location data, proximity data, gyroscope data, accelerometer data, OBD data, or the like. In an exemplary embodiment, the set of sensors may further include alcohol and smoke sensors (not shown) to monitor drinking and smoking behavior of each driver, respectively. In an embodiment, each of the vehicles 102a-102c and 104a-104c further includes a set of image-capturing devices (e.g., a camera) installed with it. Each image-capturing device generates image data and communicates the image data to at least one of the vehicle devices 110a-110c and 112a-112c (e.g., the vehicle device 112a of the vehicle 104a) or the application server 114, either directly or by means of the intermediate communication devices (such as the vehicle devices 110a-110c and 112a-112c). The set of sensors and the set of image-capturing devices are described in detail in conjunction with FIG. 2.

The data source 106 is a data management and storage server that is communicatively coupled with the communication network 116 for performing one or more operations, such as receiving, storing, processing, and transmitting queries, data, or content, such as environmental data. The environmental data includes at least one of meteorological data and road data. The data source 106 includes first and second memory (not shown) for managing and storing the meteorological data and the road data, respectively. In an embodiment, the data source 106 may be communicatively coupled with a third-party remote server (not shown) or a weblink associated with a meteorological department of the geographical region for extracting the meteorological data that is relevant to the geographical region, and more specifically, is relevant to the route under consideration. The meteorological data includes weather information associated with various geographical regions including at least the geographical region. For example, the meteorological data may include the weather information corresponding to temperature, intensity of rainfall, hail, snow, wind speed, tornadoes, blizzards, or the like.

In an embodiment, the data source 106 may be communicatively coupled with a third-party remote server (not shown) or a weblink associated with a road department of the geographical region for extracting the road data that is relevant to the geographical region, and more specifically, is relevant to the route under consideration. The road data includes road conditions associated with the various geographical regions. For example, the road data may include road condition information corresponding to a presence of snow on roads, road blockages due to maintenance works, water-loggings, intersections, traffic signs, potholes, or the like. Further, in an embodiment, the data source 106 may receive a first query, from at least one of the vehicle devices 110a-110c and 112a-112c (e.g., the vehicle device 112a of the vehicle 104a) or the application server 114 over the communication network 116, to retrieve the environmental data associated with the route. In response to the first query, the data source 106 extracts and transmits the requested information to at least one of the vehicle devices 110a-110c and 112a-112c (e.g., the vehicle device 112a of the vehicle 104a) or the application server 114 over the communication network 116. Examples of the data source 106 include, but are not limited to, a personal computer, a laptop, or a network of computer systems.

The data source 108 is a data management and storage server that is communicatively coupled with the communication network 116 for performing one or more operations, such as receiving, storing, processing, and transmitting queries, data, or content, such as fleet data. The fleet data includes at least one of accident data, passenger feedback data, safety-response-ticket data, and vehicle maintenance data. The data source 108 includes third, fourth, fifth, and sixth memory (not shown) for managing and storing the accident data, the passenger feedback data, the safety-response-ticket data, and the vehicle maintenance data, respectively. The data source 108 receives the accident data from each of the vehicles 102a-102c and 104a-104c and stores it in the third memory. In another example, the data source 108 may be communicatively coupled with a third-party remote server (not shown) or a weblink associated with an accident and emergency department of the geographical region for extracting the accident data that is relevant to the geographical region, and more specifically, is relevant to the route under consideration. The accident data includes information corresponding to locations, time, damages, causes, and any other accident-related relevant information associated with the geographical region, and more specifically, associated with the route.

In an embodiment, the data source 108 further receives the passenger feedback data from various passenger devices of the passengers who have availed (or are currently availing) the on-demand vehicle services using various vehicles, such as the vehicles 102a-102c and 104a-104c, and stores it in the fourth memory. The passenger feedback data may correspond to driving behavior of each driver, demeanor of each driver, or the like. The data source 108 further stores the safety-response-ticket data associated with each driver of each vehicle in the fifth memory. The safety-response-ticket data may correspond to unnatural or suspicious behavior of each driver. The data source 108 may include a safety-response-ticket generator (not shown) that receives the sensor and image data from each vehicle and the passenger feedback data associated with each driver and generates the safety-response-ticket data based on the sensor and image data and/or the passenger feedback data.

In an embodiment, the data source 108 further obtains the vehicle maintenance data of each of the vehicles 104a-104c that are owned by the vehicle service provider, and stores it in the sixth memory. The vehicle maintenance data may include data associated with servicing of various vehicle parts, damages to the various vehicle parts, and the like. Further, in an embodiment, the data source 108 may receive a second query, from at least one of the vehicle devices 110a-110c and 112a-112c (e.g., the vehicle device 112a of the vehicle 104a) or the application server 114 over the communication network 116, to retrieve the fleet data associated with the route (i.e., the accident data of each accident associated with the route, the passenger feedback data, and the safety-response-ticket data associated with each driver of each of the vehicles 102a-102c and 104a-104c, along with the vehicle maintenance data of each of the vehicles 104a-104c. In response to the second query, the data source 108 extracts and transmits the requested information to at least one of the vehicle devices 110a-110c and 112a-112c (e.g., the vehicle device 112a of the vehicle 104a) or the application server 114 over the communication network 116. Examples of the data source 108 include, but are not limited to, a personal computer, a laptop, or a network of computer systems.

A vehicle device (such as the vehicle device 110a, 110b, 110c, 112a, 112b, or 112c) is a computing device that is embedded inside each vehicle, such as the vehicle 102a, 102b, 102c, 104a, 104b, or 104c, respectively. Examples of each vehicle device include, but are not limited to, a mobile phone, a tablet, a laptop, a vehicle head unit, or any other portable communication device that is placed inside the vehicle. Each of the vehicle devices 110a-110c and 112a-

112c may be communicatively connected to the set of sensors, the set of image-capturing devices, a vehicle control system, an engine control system, an entertainment control system, or the like.

In an embodiment, each vehicle device, for example, the vehicle device 112a receives the sensor and image data from the vehicles 102a-102c and 104a-104c. The sensor and image data are received based on at least current location information of each of the vehicles 102a-102c and 104b-104c with respect to current location information of the vehicle 104a. The vehicle device 112a transmits the first query to the data source 106 to retrieve the environmental data associated with the route. Similarly, the vehicle device 112a transmits the second query to the data source 108 to retrieve the fleet data associated with the route.

Further, in an embodiment, the vehicle device 112a processes the sensor data to generate a first set of driving-assisting features and the image data to generate a second set of driving-assisting features. The vehicle device 112a uses one or more processing techniques, such as deep learning and image processing techniques, to process the sensor and image data and generate the first and second sets of driving-assisting features, respectively. The first set of driving-assisting features is indicative of real-time traffic conditions along the route, real-time road conditions along the route, speed-time-distance attributes, braking-and-acceleration frequency, and health conditions of each vehicle, a proximity distance of each outside-vehicle object with respect to the vehicle 104a, and driving patterns of each driver of each vehicle. The second set of driving-assisting features is indicative of vision-based real-time traffic conditions along the route, vision-based real-time weather conditions along the route, vision-based real-time road conditions along the route, and vision-based real-time driving behavior of each driver. The second set of driving-assisting features may further be indicative of the proximity distance of each outside-vehicle object with respect to the vehicle 104a. In an example, the vehicle device 112a determines the vision-based real-time driving behavior of the fourth driver and the proximity distance of each outside-vehicle object with respect to the vehicle 104a by processing the image data received from the vehicle 104a and the vision-based real-time traffic conditions, weather conditions, and road conditions along the route by processing the image data received from the vehicles 102a-102c and 104a-104c. The vision-based real-time driving behavior of each driver corresponds to a physical state of each driver (such as drowsiness, fatigue, or the like) and attentiveness of each driver.

The vehicle device 112a further processes the environmental data associated with the route to generate a third set of driving-assisting features. The third set of driving-assisting features is indicative of environmental conditions and accident-prone zones of the route. The vehicle device 112a further processes the fleet data associated with the route to generate a fourth set of driving-assisting features that is indicative of accident patterns, vehicles' health conditions, drivers' risk profiles, and accident location and time of each accident associated with the route. The vehicle device 112a uses one or more processing techniques, such as deep learning and image processing techniques, to process the environmental and fleet data and generate the third and fourth sets of driving-assisting features, respectively.

Further, the vehicle device 112a determines a risk score for the vehicle 104a based on at least one of the first, second, third, and fourth sets of driving-assisting features. If the risk score is greater than a threshold value, the vehicle device 112a generates a warning message in real-time based on at least one of the first, second, third, and fourth sets of driving-assisting features, and communicates the warning message to the fourth driver. Examples of the vehicle device 112a include, but are not limited to, a personal computer, a laptop, or a network of computer systems. The vehicle device 112a may be realized through various web-based technologies such as, but not limited to, a Java web-framework, a .NET framework, a PHP (Hypertext Preprocessor) framework, or any other web-application framework. The vehicle device 112a may further be realized through various embedded technologies such as, but not limited to, microcontrollers or microprocessors that are operating on one or more operating systems such as Windows, Android, Unix, Ubuntu, Mac OS, or the like. The various operations of the vehicle device 112a have been described in detail in conjunction with FIGS. 4, 6, 8, and 9.

The application server 114 is a computing device, a software framework, or a combination thereof, that may provide a generalized approach to create the application server implementation. The operation of the application server 114 may be dedicated to execution of procedures, such as, but not limited to, programs, routines, or scripts stored in one or more memory units for supporting its applied applications. The application server 114 receives the sensor and image data from each vehicle of the sets of vehicles 102 and 104. The application server 114 transmits the first query to the data source 106 to retrieve the environmental data associated with the route. Similarly, the application server 114 transmits the second query to the data source 108 to retrieve the fleet data associated with the route. Further, in an embodiment, the application server 114 processes the sensor data to generate the first set of driving-assisting features and the image data to generate the second set of driving-assisting features. The application server 114 further processes the environmental and fleet data associated with the route to generate the third and fourth sets of driving-assisting features, respectively.

The application server 114 determines the risk score for the vehicle 104a based on at least one of the first, second, third, and fourth sets of driving-assisting features. If the risk score is greater than the threshold value, the application server 114 generates the warning message in real-time, based on at least one of the first, second, third, and fourth sets of driving-assisting features, and communicates the warning message to the fourth driver in real-time. Examples of the application server 114 include, but are not limited to, a personal computer, a laptop, or a network of computer systems. The application server 114 may be realized through various web-based technologies such as, but not limited to, a Java web-framework, a .NET framework, a PHP (Hypertext Preprocessor) framework, or any other web-application framework. The application server 114 may operate on one or more operating systems such as Windows, Android, Unix, Ubuntu, Mac OS, or the like. The various operations of the application server 114 have been described in detail in conjunction with FIGS. 3, 5, 7 and 9.

Figure 2:
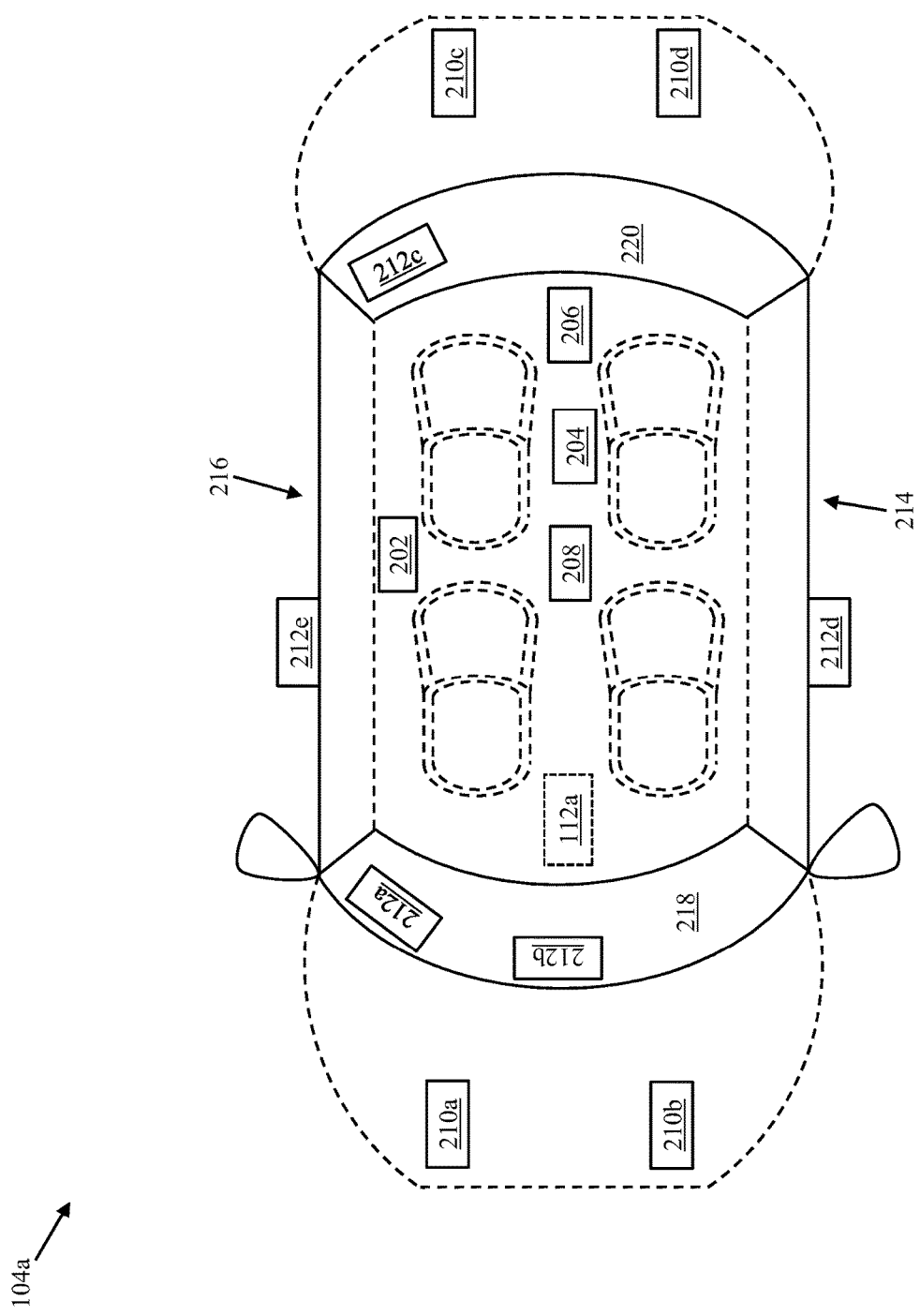
FIG. 2 illustrates a top view of a vehicle of the environment of FIG. 1, in accordance with an embodiment of the present invention.

FIG. 2 illustrates a top view of the vehicle 104a, in accordance with an embodiment of the present invention. The vehicle 104a includes the vehicle device 112a, a location sensor 202, a gyroscope sensor 204, an accelerometer sensor 206, an OBD sensor 208, a set of proximity sensors, such as proximity sensors 210a-210d, and a set of image-capturing devices, such as image-capturing devices 212a-212e.

The location sensor 202 is a sensor that detects and measures location coordinates of the vehicle 104a and generates the location data indicating real-time position information of the vehicle 104*a*. The gyroscope sensor 204 is a sensor that detects and measures an angular velocity of the vehicle 104*a* and generates the gyroscope data indicating the angular velocity of the vehicle 104*a*. The accelerometer sensor 206 is a sensor that detects and measures acceleration of the vehicle 104*a* and generates the accelerometer data indicating the acceleration of the vehicle 104*a*. The acceleration is a physical acceleration experienced by the vehicle 104*a* relative to a free-fall. The OBD sensor 208 is a sensor (or a group of sensors) that detects and measures various forms of diagnostic data associated with the vehicle 104*a* and generates the OBD data. The OBD data may include data, such as tire pressure, braking frequency, fuel level, temperature, speed, airflow rate, coolant temperature, spark advance, oxygen sensor test results, and the like, associated with the vehicle 104*a*. The proximity sensors 210*a*-210*d* are sensors that detect one or more nearby objects and measure their distance with respect to the vehicle 104*a* and generate the proximity data indicating a proximity distance of each outside-vehicle object (such as a pedestrian, an animal, a road-divider, a non-driveable area, a rock, another vehicle, or the like) with respect to the vehicle 104*a*. The proximity sensors 210*a*-210*d* may be embedded at one or more locations inside or outside the vehicle 104*a*. For example, the proximity sensors 210*a* and 210*b* are installed at a front end of the vehicle 104*a* and generate the proximity distances of outside-vehicle objects that are in front of the vehicle 104*a*. Similarly, the proximity sensors 210*c* and 210*d* are installed at a rear end of the vehicle 104*a* and generate the proximity distances of the outside-vehicle objects that are behind the vehicle 104*a*. It will be apparent to a person skilled in the art that the vehicle 104*a* may further include fifth and sixth proximity sensors (not shown) installed along sides 214 and 216 of the vehicle 104*a*, respectively, that generate the proximity distances of outside-vehicle objects that are along the sides 214 and 216 of the vehicle 104*a*. It will further be apparent to a person skilled in the art that the scope of the present invention is not limited to the illustration of the set of sensors as shown in FIG. 2. In various other embodiments of the present invention, position, count, and type of sensors included in the set of sensors may vary without limiting the scope of the present invention.

The image-capturing device 212*a* is a device including one or more image sensors for capturing inside-vehicle objects of the vehicle 104*a*. In an embodiment, the image-capturing device 212*a* may be installed on a windshield 218 of the vehicle 104*a*, and is oriented to face inside the vehicle 104*a* for capturing the inside-vehicle objects and generating first image data. In another embodiment, the image-capturing device 212*a* may be installed on other vehicle parts of the vehicle 104*a*, for example, a first side mirror (not shown), a first door (not shown), or the like, for capturing the inside-vehicle objects. The inside-vehicle objects include, but are not limited to, the fourth driver, one or more passengers, one or more seats, steering wheel, and gear-box.

The image-capturing device 212*b* is a device including one or more image sensors for capturing the outside-vehicle objects of the vehicle 104*a*. In an embodiment, the image-capturing device 212*b* may be installed on the windshield 218 of the vehicle 104*a*, and is oriented to face outside the vehicle 104*a* for capturing the outside-vehicle objects present in front of the vehicle 104*a*, and generating second image data. In another embodiment, the image-capturing device 212*b* may be installed on other vehicle parts of the vehicle 104*a*, for example, the first side mirror, the first door, or the like, for capturing the outside-vehicle objects present in front of the vehicle 104*a*. Similarly, the image-capturing device 212*c* is installed on a windshield 220 of the vehicle 104*a*, and is oriented to face outside the vehicle 104*a* for capturing the outside-vehicle objects present behind the vehicle 104*a*, and generating third image data. The image-capturing devices 212*d* and 212*e* may be installed along the sides 214 and 216 of the vehicle 104*a*, respectively, and are oriented to face outside the vehicle 104*a* for capturing the outside-vehicle objects present at the sides 214 and 216 of the vehicle 104*a*, and generating fourth and fifth image data, respectively. The outside-vehicle objects include pedestrians, animals, other vehicles, road-dividers, non-driveable areas, rocks, road signs, buildings, trees, and the like. The first image data may be used to determine the vision-based real-time driving behavior of the fourth driver, and the second, third, fourth, and fifth image data are used to determine the vision-based real-time traffic conditions, weather conditions, and road conditions in the vicinity of the vehicle 104*a*, and the proximity distance of each outside-vehicle object with respect to the vehicle 104*a*. In an example, the vision-based real-time weather and road conditions may indicate a lack of visibility of roads during heavy rains or fog.

It will be apparent to a person skilled in the art that the scope of the present invention is not limited to the installation of the image-capturing devices 212*a*-212*e* as shown in FIG. 2. In various other embodiments of the present invention, any of the image-capturing devices 212*a*-212*e* may be installed inside the vehicle 104*a*. It will further be apparent to a person skilled in the art that the scope of the invention is not limited to realizing the image-capturing devices 212*a* and 212*b* as separate entities. In various other embodiments, the functionalities of the image-capturing device 212*b* can be integrated into the image-capturing device 212*a*, without departing from the scope of the present invention.

The vehicles 102*a*-102*c* and 104*b*-104*c* may be structurally similar or dissimilar to the vehicle 104*a* as shown in FIG. 2. However, the installation of various sensors and image-capturing devices in each of the vehicles 102*a*-102*c* and 104*b*-104*c* and their operations and functionalities may be similar to that of the vehicle 104*a* as shown and described in conjunction with FIG. 2.

Figure 3:
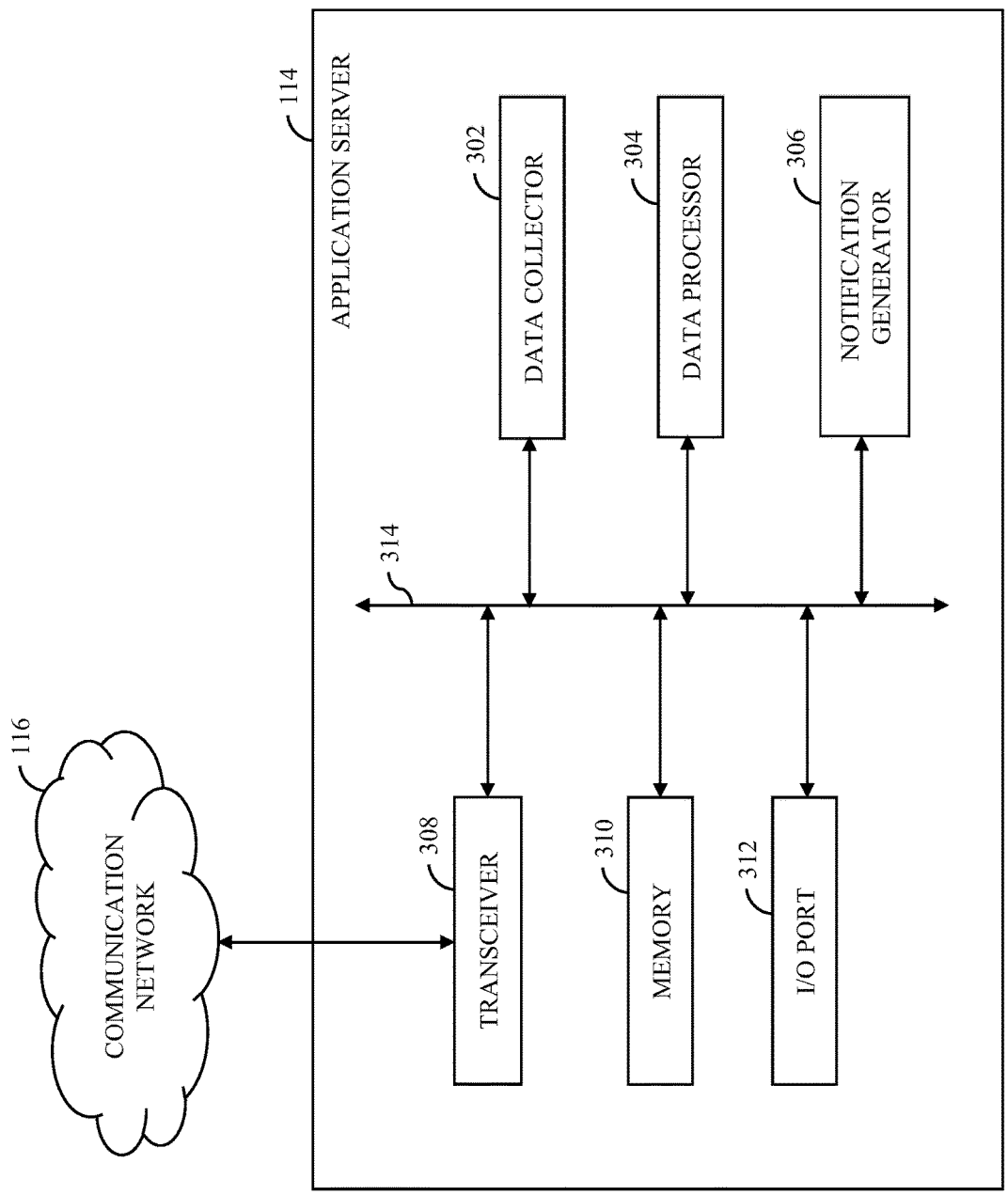
FIG. 3 is a block diagram that illustrates an application server of the environment of FIG. 1, in accordance with an embodiment of the present invention.

FIG. 3 is a block diagram that illustrates the application server 114, in accordance with an embodiment of the present invention. The application server 114 includes circuitry, such as a data collector 302, a data processor 304, a notification generator 306, a transceiver 308, a memory 310, and an input/output (I/O) port 312 that communicate with each other by way of a communication bus 314.

The data collector 302 includes suitable logic, circuitry, and/or interfaces that are operable to execute one or more instructions stored in the memory 310 to perform one or more operations. For example, the data collector 302 receives the sensor and image data from each vehicle of the sets of vehicles 102 and 104 by way of the transceiver 308 over the communication network 116. The data collector 302 further stores the received sensor and image data in the memory 310. The data collector 302 transmits the first query to the data source 106 by way of the transceiver 308 over the communication network 116 to retrieve the environmental data associated with the route, and stores the retrieved environmental data in the memory 310. Similarly, the data collector 302 transmits the second query to the data source 108 to retrieve the fleet data associated with the route, and stores the retrieved fleet data in the memory 310. The data collector 302 may be realized by use of one or more mathematical models, statistical models, and/or algorithms, such as natural-processing techniques and algorithms, image-processing techniques and algorithms, or the like. The data collector 302 may be implemented by means of one or more processors, such as, but not limited to, an application-specific integrated circuit (ASIC) processor, a reduced instruction set computing (RISC) processor, a complex instruction set computing (CISC) processor, and a field-programmable gate array (FPGA). The one or more processors may also correspond to central processing units (CPUs), graphics processing units (GPUs), network processing units (NPUs), digital signal processors (DSPs), or the like.

The data processor 304 includes suitable logic, circuitry, and/or interfaces that are operable to execute one or more instructions stored in the memory 310 to perform one or more operations. For example, the data processor 304 processes the sensor data to generate the first set of driving-assisting features and the image data to generate the second set of driving-assisting features. The data processor 304 further processes the environmental and fleet data to generate the third and fourth sets of driving-assisting features, respectively.

The data processor 304 determines the risk score for the vehicle 104a based on at least one of the first, second, third, and fourth sets of driving-assisting features. In other words, the data processor 304 determines the risk score for the vehicle 104a based on one or more feature values derived from at least one of the real-time traffic conditions along the route, the real-time road conditions along the route, the speed-time-distance attributes, the braking-and-acceleration frequency, and the health conditions of each vehicle of the sets of vehicles 102 and 104, a proximity distance of each outside-vehicle object with respect to the vehicle 104a, the driving patterns of each driver of the sets of vehicles 102 and 104, the vision-based real-time traffic conditions along the route, the vision-based real-time weather conditions along the route, the vision-based real-time road conditions along the route, the vision-based real-time driving behavior of each driver, the environmental conditions of the route, the accident-prone zones of the route, the accident patterns and accident location and time of each accident associated with the route, the health conditions of each vehicle of the set of vehicles 104, and the risk profiles of each driver of the sets of vehicles 102 and 104.

Examples of the data processor 304 include, but are not limited to, an ASIC processor, a RISC processor, a CISC processor, an FPGA processor, a CPU, a GPU, an NPU, and a DSP. It will be apparent to a person skilled in the art that the data processor 304 is compatible with multiple operating systems.

The notification generator 306 includes suitable logic, circuitry, and/or interfaces that are operable to execute one or more instructions stored in the memory 310 to perform one or more operations. The notification generator 306 generates the warning message in real-time based on at least one of the first, second, third, and fourth sets of driving-assisting features. The warning message may also be generated when the risk score for the vehicle 104a is greater than the threshold value. For example, the notification generator 306 generates a distracted driver warning message when the fourth driver is fatigued or drowsy. In another example, the notification generator 306 generates a distracted driver warning message when the risk score is greater than the threshold value. In yet another example, the notification generator 306 generates a distracted driver warning message when the fourth driver is fatigued or drowsy and the risk score is greater than the threshold value. Other examples of the warning message include, but are not limited to, a forward collision warning, a headway distance warning, a road condition warning, an accident-prone zone warning, and an over speeding warning. The notification generator 306 further alerts the fourth driver by communicating the warning message to the fourth driver. The notification generator 306 may communicate the warning message to the fourth driver by displaying a text message corresponding to the warning message on a display (not shown) of a driver device (not shown) of the fourth driver or a display (shown in FIGS. 4A and 4B) of the vehicle device 112a installed in the vehicle 104a. The notification generator 306 may further communicate the warning message by means of an audio or a video signal corresponding to the warning message, such that the audio or video signal is played or streamed on the driver device or the vehicle device 112a. The notification generator 306 may further communicate the warning message by means of haptic signals on a steering wheel (not shown) of the vehicle 104a. The notification generator 306 may be realized by use of one or more mathematical models, statistical models, and/or algorithms. The notification generator 306 may be implemented by means of one or more processors, such as, but not limited to, an ASIC processor, a RISC processor, a CISC processor, an FPGA, a CPU, a GPU, an NPU, and a DSP.

The transceiver 308 includes suitable logic, circuitry, and/or interfaces that are operable to transmit (or receive) data to (or from) various devices, such as the vehicle devices 110a-110c and 112a-112c of the vehicles 102a-102c and 104a-104c, respectively, various sensors and image-capturing devices (as described in FIG. 2) of the vehicles 102a-102c and 104a-104c, and the data sources 106 and 108 over the communication network 116. Examples of the transceiver 308 include, but are not limited to, an antenna, a radio frequency transceiver, a wireless transceiver, and a Bluetooth transceiver. The transceiver 308 communicates with the communication network 116, the data sources 106 and 108, the data collector 302, the data processor 304, the notification generator 306, and the sets of vehicles 102 and 104 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G), and $5^{th}$ Generation (5G) communication protocols, or any combination thereof.

The memory 310 includes suitable logic, circuitry, and/or interfaces to store the one or more instruction that are executed by the data collector 302, the data processor 304, the notification generator 306, and the I/O port 312 to perform their operations. The memory 310 further stores the sensor and image data of each vehicle of the sets of vehicles 102 and 104. The memory 310 further stores the environmental data and the fleet data associated with the route. In addition, the memory 310 stores the generated warning message. Examples of the memory 310 include, but are not limited to, include a random-access memory (RAM), a read-only memory (ROM), a programmable ROM (PROM), an erasable PROM (EPROM), a removable storage drive, a hard disk drive (HDD), a flash memory, a solid-state memory, and the like.

It will be apparent to a person skilled in the art that the scope of the invention is not limited to realizing the memory 310 in the application server 114, as described herein. In another embodiment, the memory 310 may be realized in form of a database server or a cloud storage working in conjunction with the application server 114, without departing from the scope of the present invention.

The I/O port 312 includes suitable logic, circuitry, and/or interfaces that are operable to execute one or more instructions stored in the memory 310 to perform one or more operations. The I/O port 312 may include various input and output devices that are configured to operate under the control of the data processor 304 by way of the communication bus 314. For example, by way of the I/O port 312, an administrator associated with the application server 114 provides one or more inputs for initiating the one or more operations. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a USB port, an Ethernet port, and the like.

Figure 4A:
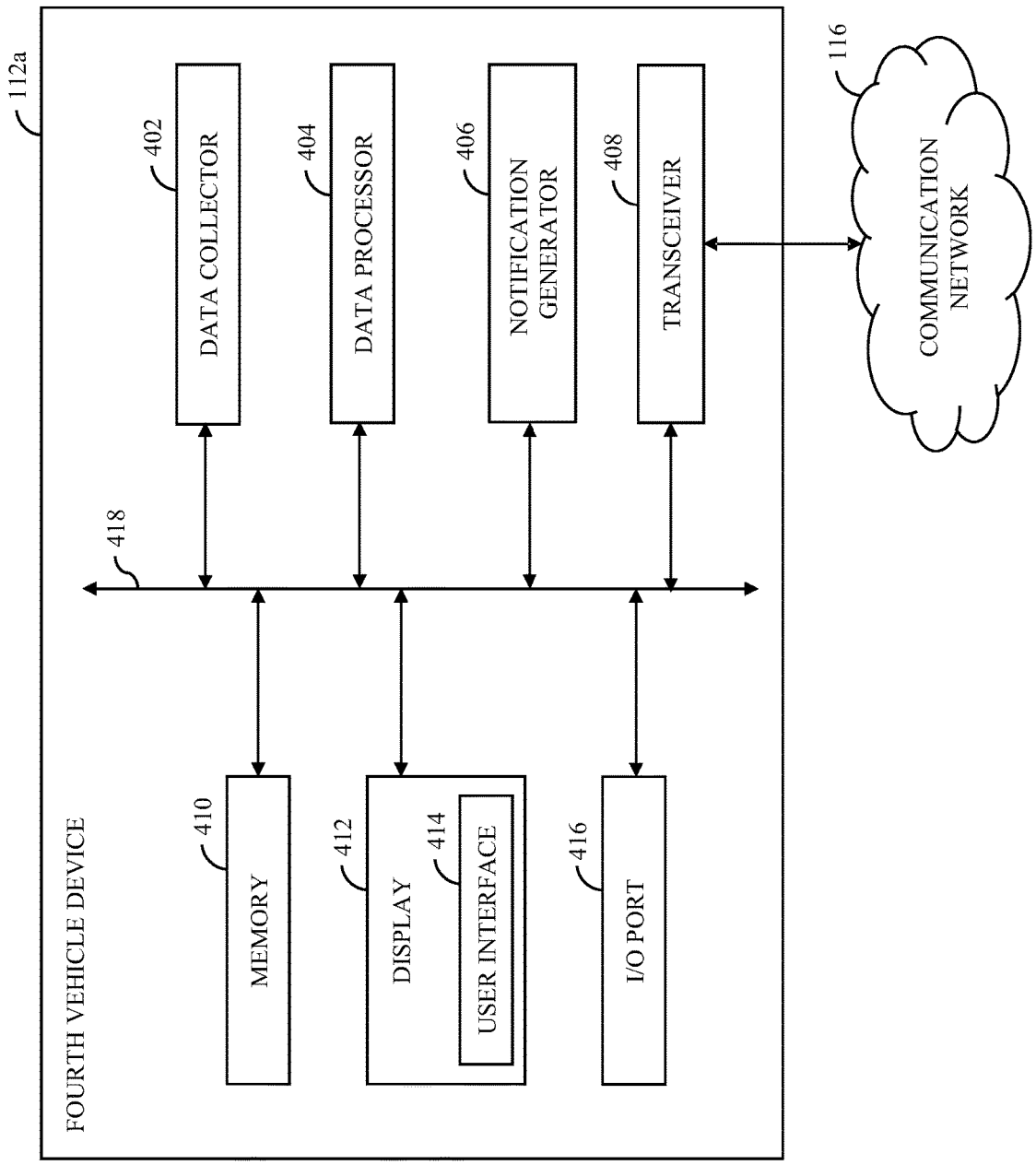
FIG. 4A is a block diagram that illustrates a vehicle device of the environment of FIG. 1, in accordance with an embodiment of the present invention.

FIG. 4A is a block diagram that illustrates the vehicle device 112a, in accordance with an embodiment of the present invention. The vehicle device 112a includes circuitry, such as a data collector 402, a data processor 404, a notification generator 406, a transceiver 408, a memory 410, a display 412 for rendering a graphical user interface (GUI) such as a user interface 414, and an input/output (I/O) port 416 that communicate with each other by way of a communication bus 418.

The data collector 402 includes suitable logic, circuitry, and/or interfaces that are operable to execute one or more instructions stored in the memory 410 to perform one or more operations. For example, the data collector 402 receives the sensor and image data from each vehicle of the sets of vehicles 102 and 104 by way of the transceiver 408 over the communication network 116. The data collector 402 further stores the received sensor and image data in the memory 410. The data collector 402 transmits the first query to the data source 106 by way of the transceiver 408 to retrieve the environmental data associated with the route, and stores the retrieved environmental data in the memory 410. Similarly, the data collector 402 transmits the second query to the data source 108 to retrieve the fleet data associated with the route, and stores the retrieved fleet data in the memory 410. The data collector 402 may be realized by use of one or more mathematical models, statistical models, and/or algorithms, such as natural-processing techniques and algorithms, image-processing techniques and algorithms, or the like. The data collector 402 may be implemented by means of one or more processors, such as, but not limited to, an ASIC processor, a RISC processor, a CISC processor, an FPGA, a CPU, a GPU, an NPU, and a DSP.

The data processor 404 includes suitable logic, circuitry, and/or interfaces that are operable to execute one or more instructions stored in the memory 410 to perform one or more operations. For example, the data processor 404 processes the sensor data to generate the first set of driving-assisting features and the image data to generate the second set of driving-assisting features. The data processor 404 processes the environmental and fleet data associated with the route to generate the third and fourth sets of driving-assisting features, respectively. The data processor 404 further determines the risk score for the vehicle 104a based on at least one of the first, second, third, and fourth sets of driving-assisting features. Examples of the data processor 404 include, but are not limited to, an ASIC processor, a RISC processor, a CISC processor, an FPGA, a CPU, a GPU, an NPU, and a DSP. It will be apparent to a person skilled in the art that the data processor 404 is compatible with multiple operating systems.

The notification generator 406 includes suitable logic, circuitry, and/or interfaces that are operable to execute one or more instructions stored in the memory 410 to perform one or more operations. For example, the notification generator 406 generates the warning message in real-time based on at least one of the first, second, third, and fourth sets of driving-assisting features. In another example, the notification generator 406 generates the warning message when the risk score for the vehicle 104a is greater than the threshold value. In yet another example, the notification generator 406 generates the warning message based on at least one of the first, second, third, and fourth sets of driving-assisting features, when the risk score for the vehicle 104a is greater than the threshold value. The notification generator 406 alerts the fourth driver by communicating the warning message to the fourth driver. The notification generator 406 may communicate the warning message to the fourth driver by means of a short message service (SMS), an audio message, a video message, a haptic message, or the like. The notification generator 406 may be realized by use of one or more mathematical models, statistical models, and/or algorithms. The notification generator 406 may be implemented by means of one or more processors, such as, but not limited to, an ASIC processor, a RISC processor, a CISC processor, an FPGA, a CPU, a GPU, an NPU, and a DSP.

The transceiver 408 includes suitable logic, circuitry, and/or interfaces that are operable to transmit (or receive) data to (or from) various devices, such as the vehicle devices 110a-110c and 112a-112c of the vehicles 102a-102c and 104a-104c, respectively, various sensors and image-capturing devices (as described in FIG. 2) of the vehicles 102a-102c and 104a-104c, the data sources 106 and 108, and the application server 114 over the communication network 116. Examples of the transceiver 408 include, but are not limited to, an antenna, a radio frequency transceiver, a wireless transceiver, and a Bluetooth transceiver. The transceiver 408 communicates with the data sources 106 and 108, the vehicle devices 110a-110c and 112b-112c, the application server 114, the data collector 402, the data processor 404, the notification generator 406 and the sets of vehicles 102 and 104 using various wired and wireless communication protocols, such as TCP/IP, UDP, 2G, 3G, 4G, and 5G communication protocols, or any combination thereof.

The memory 410 includes suitable logic, circuitry, and/or interfaces to store the one or more instruction that are executed by the data collector 402, the data processor 404, the notification generator 406, the display 412, and the I/O port 416 to perform their operations. The memory 410 further stores the sensor and image data of each vehicle of the sets of vehicles 102 and 104. The memory 410 further stores the environmental data and the fleet data associated with the route. In addition, the memory 410 stores the generated warning message. Examples of the memory 410 include, but are not limited to, include a RAM, a ROM, a PROM, an EPROM, a removable storage drive, an HDD, a flash memory, a solid-state memory, and the like.

The display 412 includes suitable logic, circuitry, and/or interfaces that are operable to execute one or more instructions stored in the memory 410 to perform one or more operations. For example, the display 412 displays one or more user interfaces, such as the user interface 414. In one example, the user interface 414 may display the warning message. Examples of the display 412 include, but are not limited to, a thin film transistor liquid crystal display (TFT LCD), an in-plane switching (IPS) LCD, a Resistive Touchscreen LCD, a Capacitive Touchscreen LCD, an organic light emitting diode (OLED), an active-matrix organic light emitting diode (AMOLED), a Super AMOLED, a Retina Display, and a head-up display (HUD).

The I/O port 416 includes suitable logic, circuitry, and/or interfaces that are operable to execute one or more instructions stored in the memory 410 to perform one or more operations. The I/O port 416 may include various input and output devices that are configured to operate under the control of the data processor 404 by way of the communication bus 418. For example, by way of the I/O port 416, an administrator associated with the vehicle device 112a provides one or more inputs for initiating the one or more operations. Examples of the input devices may include a USB port, an Ethernet port, a real or virtual keyboard, a mouse, a joystick, a touch screen, a stylus, a microphone, and the like. Examples of the output devices may include a display screen, a speaker, headphones, a USB port, an Ethernet port, and the like.

Figure 4B:
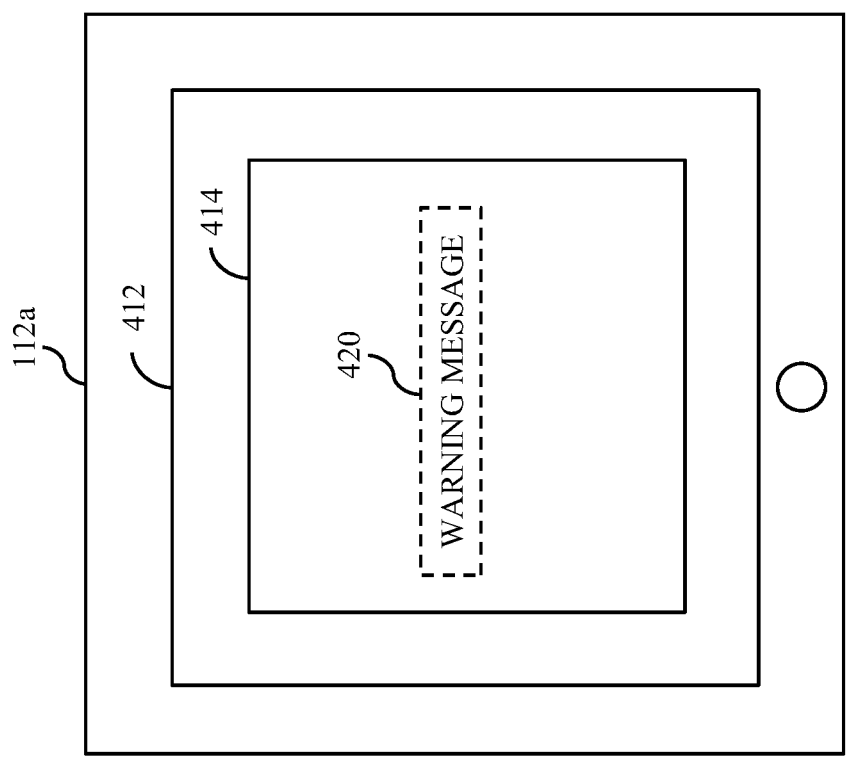
FIG. 4B is a block diagram that illustrates a user interface presenting a warning message on the vehicle device, in accordance with an embodiment of the present invention.

FIG. 4B is a block diagram that illustrates the user interface 414 presenting the warning message, in accordance with an embodiment of the present invention. The user interface 414 has been rendered on the display 412 of the vehicle device 112a. The user interface 414 includes a message section 420 for displaying the warning message. The warning message displayed in the message section 420 may be indicative of a forward collision warning, a headway distance warning, a road condition warning, an accident-prone zone warning, an over speeding warning, a distracted driver warning, or the like.

Although FIG. 4B illustrates the user interface 414 rendered on the vehicle device 112a, it will be apparent to a person having ordinary skill in the art that a user interface similar to the user interface 414 may be rendered on the display of the driver device of the fourth driver to communicate the warning message without limiting the scope of the present invention.

Figure 5:
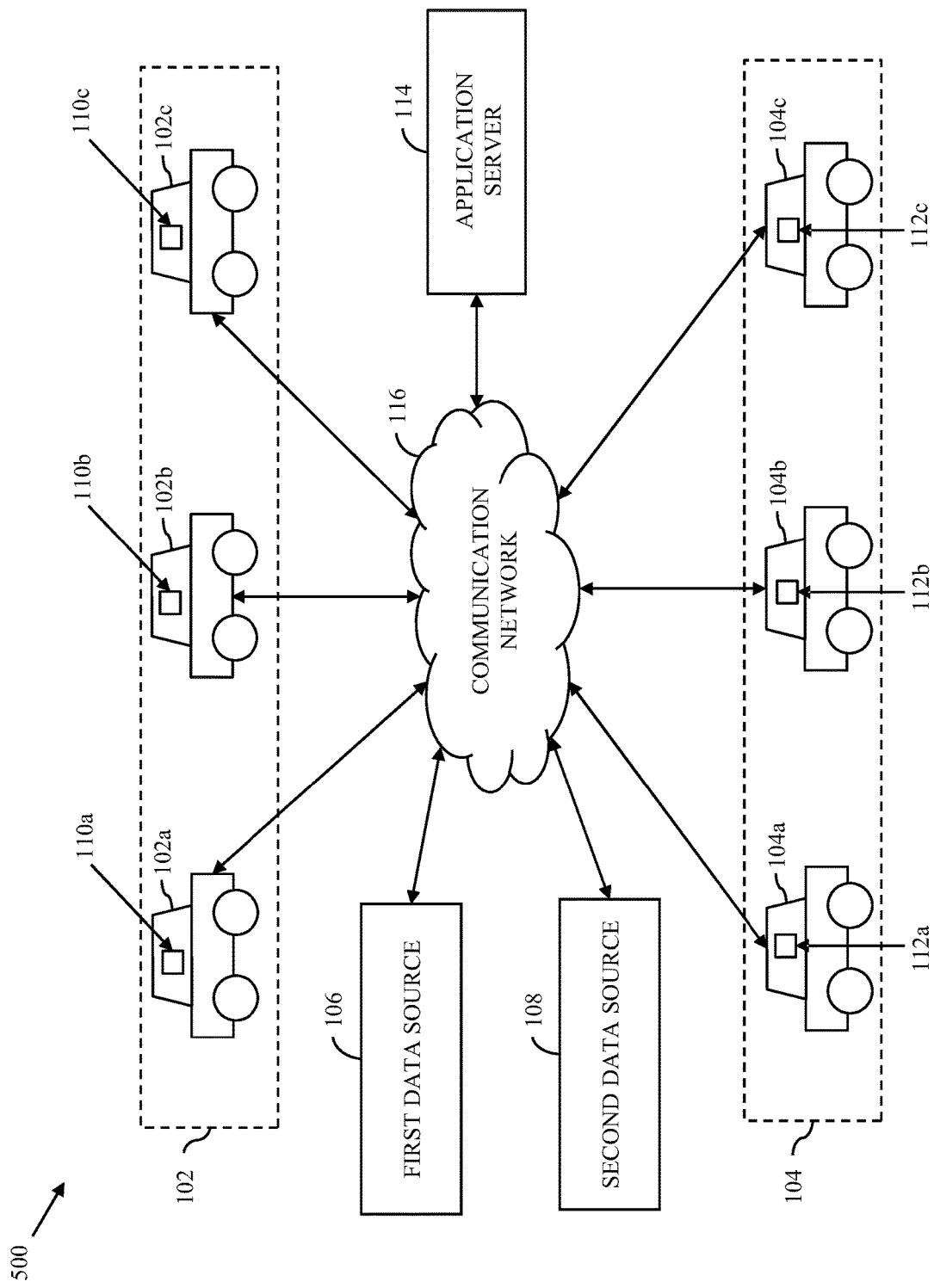
FIG. 5 is a block diagram that illustrates an exemplary environment for assisting a driver of the vehicle, in accordance with an embodiment of the present invention.

FIG. 5 is a block diagram that illustrates an exemplary environment 500 for assisting a driver of a vehicle, in accordance with an embodiment of the present invention. In the ongoing description, it has been assumed that the driver is the fourth driver and the associated vehicle is the vehicle 104a. However, in various other embodiments, the driver may be any one of the first, second, third, fifth, or sixth driver, and the vehicle may be any one of the vehicles 102a-102c, 104b, and 104c. The fourth driver is driving the vehicle 104a along the route. The other vehicles, for example, the vehicles 102a-102c, 104b, and 104c are also traversing along the same route or few of them have already traversed through the route in near-time. The vehicles 102a-102c and 104a-104c are connected to the same platform facilitated by the vehicle service provider.

The data collector 302 obtains the sensor data from the set of sensors installed in the vehicle 104a and the image data from the set of image-capturing devices installed with the vehicle 104a. Similarly, the data collector 302 obtains the sensor data from the set of sensors installed in each of the vehicles 102a-102c, 104b, and 104c, and the image data from the set of image-capturing devices installed with each of the vehicles 102a-102c, 104b, and 104c. The data collector 302 further retrieves the environmental and fleet data associated with the route from the data sources 106 and 108, respectively.

The data processor 304 processes the sensor data including at least one of the location data, the proximity data, the gyroscope data, the accelerometer data, and the OBD of each vehicle to generate the first set of driving-assisting features. The first set of driving-assisting features is indicative of the real-time traffic conditions along the route, the real-time road conditions along the route, the speed-time-distance attributes of each vehicle, the braking-and-acceleration frequency of each vehicle, the health conditions of each vehicle, the proximity distance of each outside-vehicle object with respect to the vehicle 104a, and the driving patterns of each driver. The data processor 304 further processes the image data (e.g., the first through fifth image data) to generate the second set of driving-assisting features. The first image data corresponds to the inside-vehicle objects such as the fourth driver, passengers, seats, steering wheel, gear-box, and the like. The second through fifth image data may correspond to the outside-vehicle objects such as the pedestrians, animals, other vehicles, road-dividers, non-driveable areas, rocks, road signs, buildings, trees, and the like. The second set of driving-assisting features is indicative of the vision-based real-time traffic conditions along the route, the vision-based real-time weather conditions along the route, the vision-based real-time road conditions along the route, and the vision-based real-time driving behavior of each driver. The second set of driving-assisting features may further be indicative of the proximity distance of each outside-vehicle object with respect to the vehicle 104a. For example, the data processor 304 determines the vision-based real-time driving behavior (e.g., drowsiness, distracted behavior, impaired behavior, inattentive behavior, or the like) of each driver by processing the first image data, and the vision-based real-time traffic conditions (e.g., high, medium, or low traffic congestions) along the route, the vision-based real-time weather conditions (e.g., foggy, rainy, dusty, smoky, smog, or the like) along the route, the vision-based real-time road conditions (e.g., potholes, speed breakers, road dividers, or the like) along the route, and the proximity distance of each outside-vehicle object with respect to the vehicle 104a by processing the second through fifth image data.

The data collector 302 retrieves the environmental and fleet data associated with the route. The environmental data includes at least one of the meteorological data and the road data associated with the route. The fleet data includes at least one of the accident data, the passenger feedback data, and the safety-response-ticket data of each vehicle of the sets of vehicles 102 and 104 along with the vehicle maintenance data of each vehicle of the set of vehicles 104. The data processor 304 processes the environmental and fleet data associated with the route to generate the third and fourth set of driving assisting features, respectively. The third set of driving-assisting features is indicative of the environmental conditions (e.g., foggy, rainy, dusty, smoky, smogy, or the like) and the accident-prone zones of the route along with their position information on the route. The fourth set of driving-assisting features is indicative of the accident pattern and accident location and time of each accident associated with the route, the health conditions of each vehicle of the set of vehicles 104, and the risk profile of each driver. The data processor 304 generates the accident pattern and accident location and time of each accident associated with the route based on the accident data. Further, the data processor 304 generates the risk profiles of each driver based on at least one of the safety-response-ticket data and the passenger feedback data associated with the corresponding driver. The data processor 304 further generates the health conditions of each vehicle of the set of vehicles 104 based on the vehicle maintenance data.

Further, in an embodiment, the data processor 304 determines the risk score for the vehicle 104a based on at least one of the first, second, third, and fourth sets of driving-assisting features. In other words, the data processor 304 determines the risk score for the vehicle 104a based on one or more feature values derived from at least one of the real-time traffic conditions along the route, the real-time road conditions along the route, the speed-time-distance attributes of each vehicle, the braking-and-acceleration frequency of each vehicle, the health conditions of each vehicle, the proximity distance of each outside-vehicle object with respect to the vehicle 104a, the driving patterns of each driver of the sets of vehicles 102 and 104, the vision-based real-time traffic conditions along the route, the vision-based real-time weather conditions along the route, the vision-based real-time road conditions along the route, the vision-based real-time driving behavior of each driver, the environmental conditions of the route, the accident-prone zones of the route, the accident patterns and accident location and time of each accident associated with the route, the health conditions of each vehicle of the set of vehicles 104, and the risk profiles of each driver of the sets of vehicles 102 and 104. In an example, based on processing of the first image data of the vehicle 104a and generation of the vision-based real-time driving behavior of the fourth driver, if the data processor 304 determines that the fourth driver is fatigued or drowsy, the risk score for the vehicle 104a determined by the data processor 304 is greater than the threshold value. In another example, the data processor 304 may determine an impending collision of the vehicle 104a with an outside-vehicle object based on the speed of the vehicle 104a, a proximity distance of the outside-vehicle to the vehicle 104a, and the like. The data processor 304 may determine the speed of the vehicle 104a and the proximity distance of the outside-vehicle to the vehicle 104a based on the sensor and image data received from the vehicle 104a, and the sensor and image data received from various vehicles (such as the vehicles 102a-102c and 104b-104c) in the vicinity of the vehicle 104a. In such a scenario, the risk score for the vehicle 104a is greater than the threshold value.

The notification generator 306 further checks if the risk score for the vehicle 104a is greater than the threshold value. If the notification generator 306 determines that the risk score is greater than the threshold value, the notification generator 306 generates the warning message in real-time based on at least one of the first, second, third, and fourth sets of driving-assisting features. In an example, as the risk score for the vehicle 104a is greater than the threshold value, the notification generator 306 generates a distracted driver warning if the fourth driver is fatigued or drowsy, or a forward collision warning if there is an impending collision. Other examples of the warning message include the headway distance warning, the road condition warning, the accident-prone zone warning, the over speeding warning, and the like. In another embodiment, the notification generator 306 generates the warning message in real-time based on at least one of the first, second, third, and fourth sets of driving-assisting features irrespective of the risk score associated with the vehicle 104a. The notification generator 306 further communicates the warning message to the fourth driver for alerting the fourth driver. The notification generator 306 may communicate the warning message to the fourth driver by displaying the text message (indicating the warning message) on the display of the driver device of the fourth driver or the display 412, playing or streaming the audio or video signal in real-time (indicating the warning message) on the driver device or the vehicle device 112a, or generating haptic signals on the steering wheel of the vehicle 104a.

Although the FIG. 5 describes a system for assisting the fourth driver, it will be apparent to a person skilled in the art that any of the first, second, third, fifth, or sixth driver may be assisted while driving the corresponding vehicle using the above-mentioned system.

Figure 6:
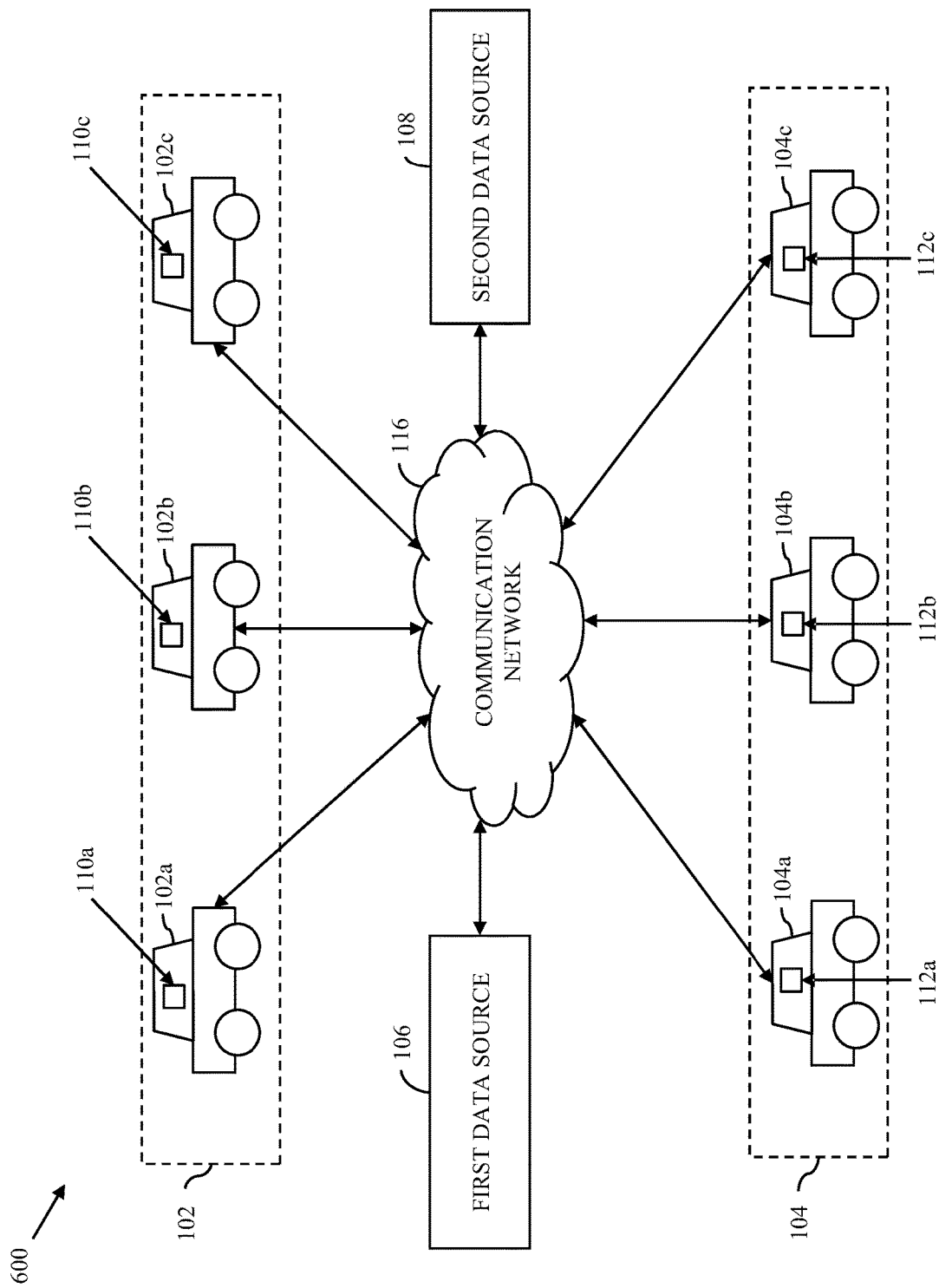
FIG. 6 is a block diagram that illustrates an exemplary environment for assisting the driver of the vehicle, in accordance with another embodiment of the present invention.

FIG. 6 is a block diagram that illustrates an exemplary environment 600 for assisting a driver of a vehicle, in accordance with another embodiment of the present invention. In the ongoing description, it has been assumed that the driver is the fourth driver and the associated vehicle is the vehicle 104a. However, in various other embodiments, the driver may be any one of the first, second, third, fifth, or sixth driver, and the vehicle may be any one of the vehicles 102a-102c, 104b and, 104c. The fourth driver is driving the vehicle 104a along the route. The other vehicles, for example, the vehicles 102a-102c, 104b, and 104c are also traversing along the same route or few of them have already traversed through the route in near-time. The vehicles 102a-102c and 104a-104c are connected to the same platform facilitated by the vehicle service provider.

The data collector 402 obtains the sensor data from the set of sensors installed in the vehicle 104a and the image data from the set of image-capturing devices installed with the vehicle 104a. Similarly, the data collector 402 obtains the sensor data from the set of sensors installed in each of the vehicles 102a-102c, 104b, and 104c, and the image data from the set of image-capturing devices installed with each of the vehicles 102a-102c, 104b, and 104c. The data collector 402 further retrieves the environmental and fleet data associated with the route from the data sources 106 and 108, respectively.

The data processor 404 processes the sensor data including at least one of the location data, the proximity data, the gyroscope data, the accelerometer data, and the OBD of each vehicle to generate the first set of driving-assisting features. The data processor 404 further processes the image data (e.g., the first through fifth image data) to generate the second set of driving-assisting features. The data processor 404 further processes the environmental and fleet data associated with the route to generate the third and fourth set of driving assisting features, respectively.

Further, in an embodiment, the data processor 404 determines the risk score for the vehicle 104a based on at least one of the first, second, third, and fourth sets of driving-assisting features. The notification generator 406 further checks if the risk score for the vehicle 104a is greater than the threshold value. If the notification generator 406 determines that the risk score is greater than the threshold value, the notification generator 406 generates the warning message in real-time based on at least one of the first, second, third, and fourth sets of driving-assisting features. In an example, as the risk score for the vehicle 104a is greater than the threshold value, the notification generator 406 generates a distracted driver warning if the fourth driver is fatigued or drowsy, or a forward collision warning if there is an impending collision. Other examples of the warning message may include the headway distance warning, the road condition warning, the accident-prone zone warning, the over speeding warning, and the like. The notification generator 406 further communicates the warning message to the fourth driver for alerting the fourth driver. The notification generator 406 may communicate the warning message to the fourth driver by displaying the text message (indicating the warning message) on the display of the driver device of the fourth driver or the display 412, playing or streaming the audio or video signal in real-time (indicating the warning message) on the driver device or the vehicle device 112a, or generating haptic signals on the steering wheel of the vehicle 104a.

Although the FIG. 6 describes a system for assisting the fourth driver, it will be apparent to a person skilled in the art that any of the first, second, third, fifth, or sixth driver may be assisted while driving the corresponding vehicle using the above-mentioned system.

Figure 7:
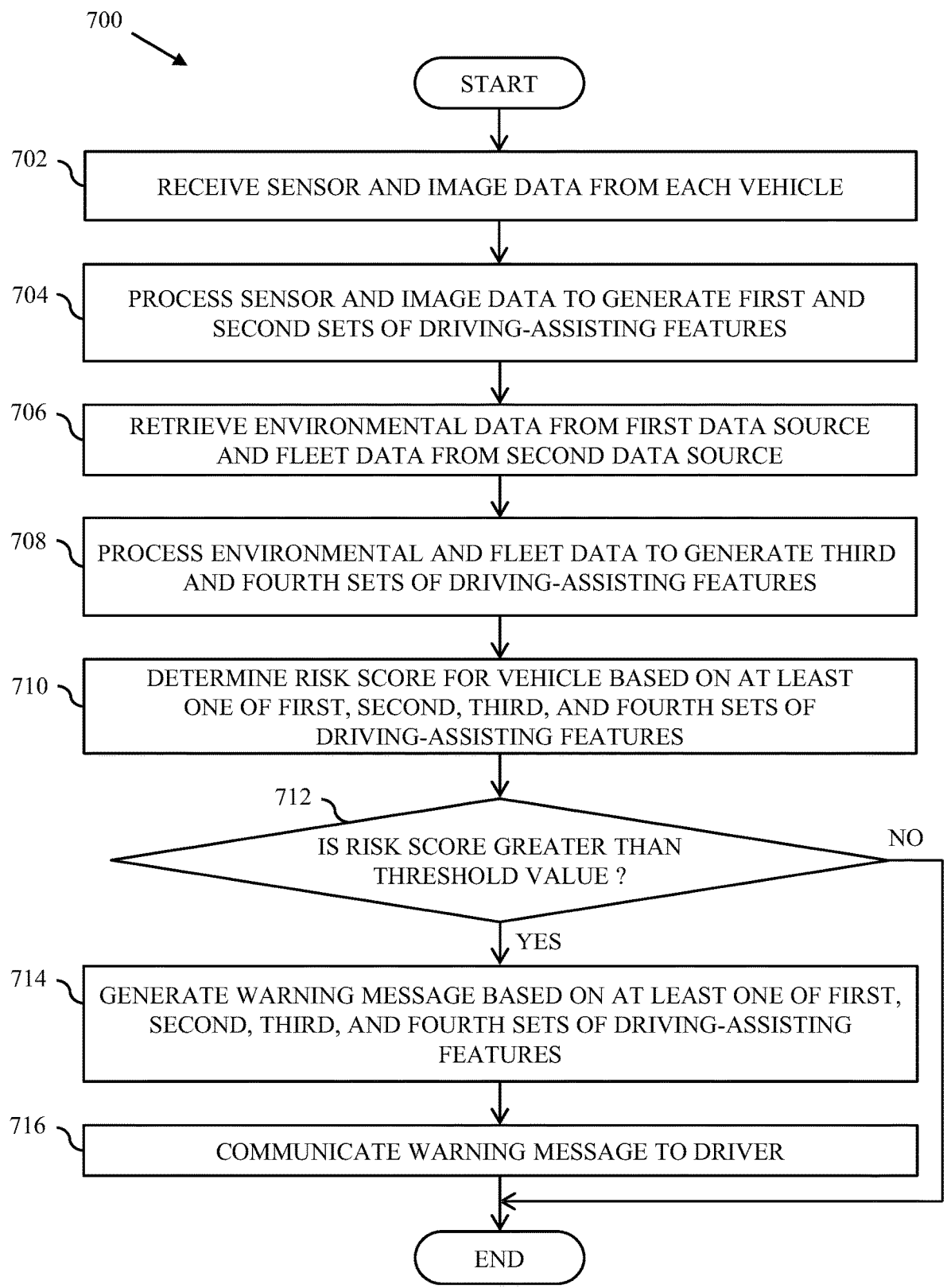
FIG. 7 is a flow chart that illustrates a method for assisting the driver of the vehicle, in accordance with an embodiment of the present invention.

FIG. 7 is a flow chart 700 that illustrates a method for assisting a driver of a vehicle, in accordance with an embodiment of the present invention. For the sake of the ongoing description, it is assumed that the driver is the fourth driver and the vehicle is the vehicle 104a, and the fourth driver is driving the vehicle 104a along the route.

At step 702, the data collector 302 of the application server 114 receives the sensor and image data from each vehicle of the sets of vehicles 102 and 104. The sensor data is received by way of the set of sensors installed in each vehicle and the image data is received by way of the set of image-capturing devices installed with each vehicle. The sensor data includes at least one of the location data, the proximity data, the gyroscope data, the accelerometer data, and the OBD of each vehicle and the image data corresponds to the inside-vehicle and outside-vehicle objects.

At step 704, the data processor 304 of the application server 114 processes the sensor and image data to generate the first and second sets of driving-assisting features, respectively. The first set of driving-assisting features is indicative of the real-time traffic conditions along the route, the real-time road conditions along the route, the speed-time-distance attributes, the braking-and-acceleration frequency, and the health conditions of each vehicle of the sets of vehicles 102 and 104, the proximity distance of each outside-vehicle object with respect to the vehicle 104a, and the driving patterns of each driver of the sets of vehicles 102 and 104. The second set of driving-assisting features is indicative of the vision-based real-time traffic conditions along the route, the vision-based real-time weather conditions along the route, the vision-based real-time road conditions along the route, and the vision-based real-time driving behavior of each driver. The second set of driving-assisting features may further be indicative of the proximity distance of each outside-vehicle object with respect to the vehicle 104a.

At step 706, the data collector 302 transmits the first and second queries to the data sources 106 and 108 for retrieving the environmental and fleet data associated with the route, respectively. The environmental data includes at least one of the meteorological data and the road data along the route. The fleet data includes at least one of the accident data, the passenger feedback data, and the safety-response-ticket data of each vehicle of the sets of vehicles 102 and 104, and the vehicle maintenance data of each vehicle of the set of vehicles 104.

At step 708, the data processor 304 processes the environmental and fleet data associated with the route to generate the third and fourth set of driving assisting features, respectively. The third set of driving-assisting features is indicative of the environmental conditions and the accident-prone zones of the route. The fourth set of driving-assisting features is indicative of the accident pattern and accident location and time of each accident associated with the route, the health conditions of each vehicle of the set of vehicles 104, and the risk profile of each driver of the sets of vehicles 102 and 104. The data processor 304 generates the accident pattern and accident location and time of each accident associated with the route based on the accident data. Further, the data processor 304 generates the risk profiles of each driver based on the safety-response-ticket data and the passenger feedback data associated with the corresponding driver. The data processor 304 further generates the health conditions of each vehicle of the set of vehicles 104 based on the vehicle maintenance data.

At step 710, the data processor 304 determines the risk score for the vehicle 104a based on at least one of the first, second, third, and fourth sets of driving-assisting features. In other words, the data processor 304 determines the risk score for the vehicle 104a based on one or more feature values derived from at least one of the real-time traffic conditions along the route, the real-time road conditions along the route, the speed-time-distance attributes of each vehicle of the sets of vehicles 102 and 104, the braking-and-acceleration frequency of each vehicle, the health conditions of each vehicle, the proximity distance of each outside-vehicle object with respect to the vehicle 104a, the driving patterns of each driver of the sets of vehicles 102 and 104, the vision-based real-time traffic conditions along the route, the vision-based real-time weather conditions along the route, the vision-based real-time road conditions along the route, the vision-based real-time driving behavior of each driver, the environmental conditions of the route, the accident-prone zones of the route, the accident patterns and accident location and time of each accident associated with the route, the health conditions of each vehicle of the set of vehicles 104, and the risk profiles of each driver of the sets of vehicles 102 and 104.

At step 712, the notification generator 306 of the application server 114 checks if the risk score for the vehicle 104a is greater than the threshold value, and if the risk score for the vehicle 104a is greater than the threshold value, step 714 is performed.

At step 714, the notification generator 306 generates the warning message in real-time based on at least one of the first, second, third, and fourth sets of driving-assisting features. Examples of the warning message includes, but are not limited to, a driver distracted warning, a forward collision warning, a headway distance warning, a road condition warning, an accident-prone zone warning, and an over speeding warning.

At step 716, the notification generator 306 communicates the warning message to the fourth driver to alert the fourth driver in real-time. The notification generator 306 may communicate the warning message to the fourth driver by displaying a text message indicative of the warning message on the display of the driver device of the fourth driver or the display 412, playing an audio or a video signal indicative of the warning message on the driver device or the vehicle device 112a, or generating haptic signals on the steering wheel of the vehicle 104a.

Figure 8:
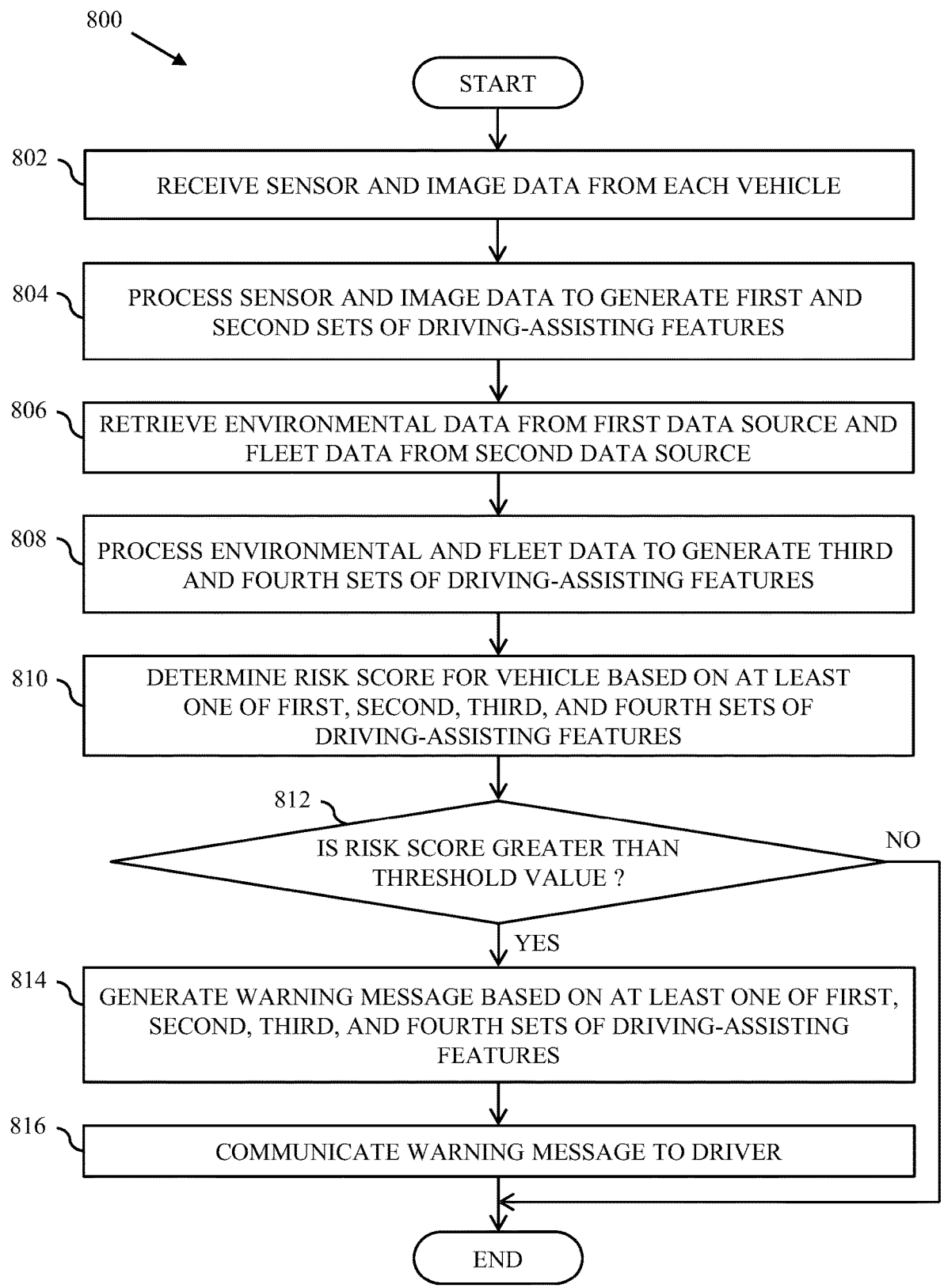
FIG. 8 is a flow chart that illustrates a method for assisting the driver of the vehicle, in accordance with another embodiment of the present invention.

FIG. 8 is a flow chart 800 that illustrates a method for assisting a driver of a vehicle, in accordance with another embodiment of the present invention. For the sake of the ongoing description, it is assumed that the driver is the fourth driver and the vehicle is the vehicle 104a, and the fourth driver is driving the vehicle 104a along the route.

At step 802, the data collector 402 of the vehicle device 112a receives the sensor and image data from each vehicle of the sets of vehicles 102 and 104. The sensor data is received by way of the set of sensors installed in each vehicle and the image data is received by way of the set of image-capturing devices installed with each vehicle. The sensor data includes at least one of the location data, the proximity data, the gyroscope data, the accelerometer data, and the OBD of each vehicle, and the image data corresponds to the inside-vehicle and outside-vehicle objects.

At step 804, the data processor 404 of the vehicle device 112a processes the sensor and image data to generate the first and second sets of driving-assisting features, respectively. The first set of driving-assisting features is indicative of the real-time traffic conditions along the route, the real-time road conditions along the route, the speed-time-distance attributes, the braking-and-acceleration frequency, and the health conditions of each vehicle of the sets of vehicles 102 and 104, the proximity distance of each outside-vehicle object with respect to the vehicle 104*a*, and the driving patterns of each driver of the sets of vehicles 102 and 104. The second set of driving-assisting features is indicative of the vision-based real-time traffic conditions along the route, the vision-based real-time weather conditions along the route, the vision-based real-time road conditions along the route, and the vision-based real-time driving behavior of each driver. The second set of driving-assisting features may further be indicative of the proximity distance of each outside-vehicle object with respect to the vehicle 104*a*.

At step 806, the data collector 402 transmits the first and second queries to the data sources 106 and 108 for retrieving the environmental and fleet data associated with the route, respectively. The environmental data includes at least one of the meteorological data and the road data along the route. The fleet data includes at least one of the accident data, the passenger feedback data, and the safety-response-ticket data of each vehicle of the sets of vehicles 102 and 104, and the vehicle maintenance data of each vehicle of the set of vehicles 104.

At step 808, the data processor 404 processes the environmental and fleet data associated with the route to generate the third and fourth set of driving assisting features, respectively. The third set of driving-assisting features is indicative of the environmental conditions and the accident-prone zones of the route. The fourth set of driving-assisting features is indicative of the accident pattern and accident location and time of each accident associated with the route, the health conditions of each vehicle of the set of vehicles 104, and the risk profile of each driver of the sets of vehicles 102 and 104. The data processor 404 generates the accident pattern and accident location and time of each accident associated with the route based on the accident data. Further, the data processor 404 generates the risk profiles of each driver based on the safety-response-ticket data and the passenger feedback data associated with the corresponding driver. The data processor 404 further generates the health conditions of each vehicle of the set of vehicles 104 based on the vehicle maintenance data.

At step 810, the data processor 404 determines the risk score for the vehicle 104*a* based on at least one of the first, second, third, and fourth sets of driving-assisting features. In other words, the data processor 404 determines the risk score for the vehicle 104*a* based on one or more feature values associated with at least one of the real-time traffic conditions along the route, the real-time road conditions along the route, the speed-time-distance attributes of each vehicle of the sets of vehicles 102 and 104, the braking-and-acceleration frequency of each vehicle, the health conditions of each vehicle, the proximity distance of each outside-vehicle object with respect to the vehicle 104*a*, the driving patterns of each driver of the sets of vehicles 102 and 104, the vision-based real-time traffic conditions along the route, the vision-based real-time weather conditions along the route, the vision-based real-time road conditions along the route, the vision-based real-time driving behavior of each driver, the environmental conditions of the route, the accident-prone zones of the route, the accident patterns and accident location and time of each accident associated with the route, the health conditions of each vehicle of the set of vehicles 104, and the risk profiles of each driver.

At step 812, the notification generator 406 of the vehicle device 112*a* checks if the risk score for the vehicle 104*a* is greater than the threshold value, and if the risk score for the vehicle 104*a* is greater than the threshold value, step 814 is performed.

At step 814, the notification generator 406 generates the warning message in real-time based on at least one of the first, second, third, and fourth sets of driving-assisting features. Examples of the warning message includes, but are not limited to, a driver distracted warning, a forward collision warning, a headway distance warning, a road condition warning, an accident-prone zone warning, and an over speeding warning.

At step 816, the notification generator 406 communicates the warning message to the fourth driver to alert the fourth driver in real-time. The notification generator 406 may communicate the warning message to the fourth driver by displaying a text message indicative of the warning message on the display of the driver device of the fourth driver or the display 412, playing an audio or a video signal indicative of the warning message on the driver device or the vehicle device 112*a*, or generating haptic signals on the steering wheel of the vehicle 104*a*.

Figure 9:
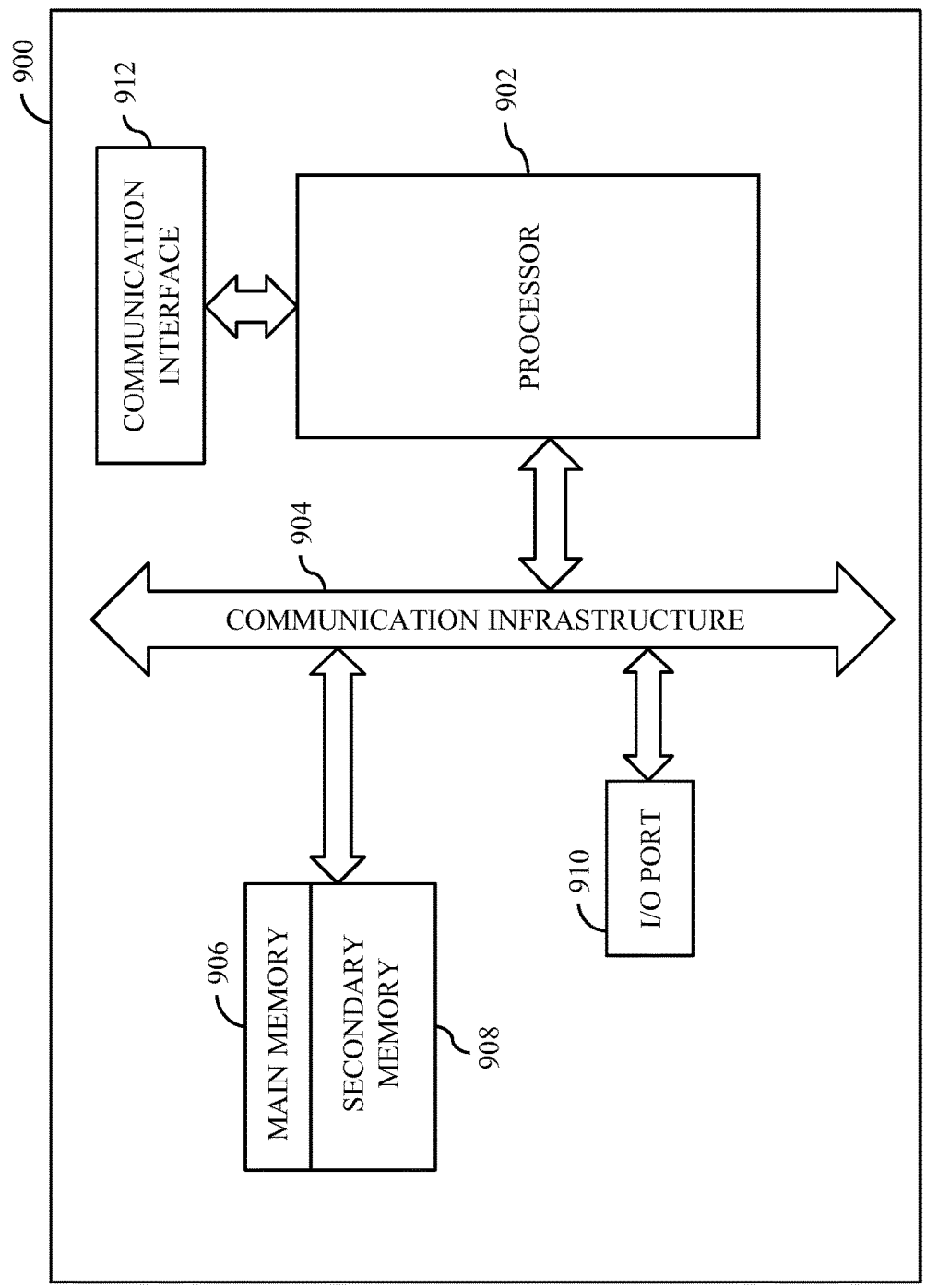
FIG. 9 is a block diagram that illustrates a computer system for assisting the driver of the vehicle, in accordance with an embodiment of the present invention.

Referring now to FIG. 9, a block diagram that illustrates a computer system 900 for assisting the driver of the vehicle, in accordance with an embodiment of the present invention. An embodiment of the present invention, or portions thereof, may be implemented as computer readable code on the computer system 900. In one example, the application server 114 and the vehicle devices 110*a*-110*c* and 112*a*-112*c* of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 7 and 8.

The computer system 900 includes a processor 902 that may be a special purpose or a general-purpose processing device. The processor 902 may be a single processor, multiple processors, or combinations thereof. The processor 902 may have one or more processor "cores." Further, the processor 902 may be connected to a communication infrastructure 904, such as a bus, a bridge, a message queue, the communication network 116, multi-core message-passing scheme, and the like. The computer system 900 further includes a main memory 906 and a secondary memory 908. Examples of the main memory 906 may include RAM, ROM, and the like. The secondary memory 908 may include a hard disk drive or a removable storage drive (not shown), such as a floppy disk drive, a magnetic tape drive, a compact disk, an optical disk drive, a flash memory, and the like. Further, the removable storage drive may read from and/or write to a removable storage device in a manner known in the art. In an embodiment, the removable storage unit may be a non-transitory computer readable recording media.

The computer system 900 further includes an input/output (I/O) port 910 and a communication interface 912. The I/O port 910 includes various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communications port, and the like. Data transferred via the communication interface 912 may be signals, such as electronic, electromagnetic, optical, or other signals as will be apparent to a person skilled in the art. The signals may travel via a communications channel, such as the communication network 116 which may be configured to transmit the signals to the various devices that are communicatively coupled to the computer system 900. Examples of the communication channel may include, but not limited to, cable, fiber optics, a phone line, a cellular phone link, a radio frequency link, a wireless link, and the like.

Computer program medium and computer usable medium may refer to memories, such as the main memory 906 and the secondary memory 908, which may be a semiconductor memory such as dynamic RAMs. These computer program mediums may provide data that enables the computer system 900 to implement the methods illustrated in FIGS. 7 and 8. In an embodiment, the present invention is implemented using a computer implemented application. The computer implemented application may be stored in a computer program product and loaded into the computer system 900 using the removable storage drive or the hard disk drive in the secondary memory 908, the I/O port 910, or the communication interface 912.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 902, and a memory, such as the main memory 906 and the secondary memory 908, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Specific advantages of the method and the system of the present invention include assisting a driver of a vehicle based on at least one of the first, second, third, and fourth set of driving-assisting features that are generated based not only on data (such as the sensor and image data) collected from the vehicle but also based on the data collected from other vehicles that are in the vicinity of the vehicle and various other data sources (such as the data sources 106 and 108). Thus, a significant number of road accidents may be avoided or minimized when the driver is warned of an impending collision, a sharp turn, accident-prone zones, improper road condition, improper weather conditions, improper health conditions of other vehicles, over speeding of the vehicle as well as the other vehicles, and the like. Thus, the driver is provided with a higher degree of driving-assistance as compared to a conventional driving-assistance approach. This also results in a significant reduction in damages to human life, animal life, and property. Further, a maintenance cost of the vehicle is also reduced as the driver is alerted of improper road conditions and his driving pattern in advance, and hence, the driver can avoid traversing through such roads and alter his driving pattern. Thus, the method and the system of the present invention provide a more efficient, a more accurate, and a more comprehensive way of assisting a driver of a vehicle as compared to the conventional driving-assistance approach.

Techniques consistent with the present invention provide, among other features, systems and methods facilitating driving-assistance to drivers of vehicles in real-time driving environment. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method for assisting a driver of a vehicle, the method comprising:

receiving, by a data collector of a server, from each vehicle of a plurality of vehicles, sensor data by way of a set of sensors installed in each vehicle, and image data by way of at least first and second image-capturing devices installed with each vehicle, wherein the plurality of vehicles include at least first and second sets of vehicles;

processing, by a data processor of the server, the sensor and image data to generate first and second sets of driving-assisting features, respectively, wherein the first set of driving-assisting features is indicative of real-time traffic conditions, real-time road conditions, speed-time-distance attributes, braking-and-acceleration frequency, and health conditions of each vehicle, and driving patterns of each driver of each vehicle, and wherein the second set of driving-assisting features is indicative of vision-based real-time traffic conditions, weather conditions, road conditions, and driving behavior of each driver;

retrieving, by the data collector, from a first data source, environmental data comprising at least one of meteorological data and road data associated with a route along which the driver is driving the vehicle, and, from a second data source, fleet data comprising at least one of accident data, safety-response-ticket data, and passenger feedback data of each vehicle of the first and second sets of vehicles, and vehicle maintenance data of each vehicle of the second set of vehicles;

processing, by the data processor, the environmental data to generate a third set of driving-assisting features that is indicative of environmental conditions and accident-prone zones of the route, and the fleet data to generate a fourth set of driving-assisting features that is indicative of accident patterns, vehicles' health conditions, drivers' risk profiles, and accident location and time of each accident associated with the route; and generating, by a notification generator of the server, a warning message based on at least one of the first, second, third, and fourth sets of driving-assisting features, to alert the driver of the vehicle in real-time.

2. The method of claim 1, wherein the sensor data includes at least one of location data, proximity data, gyroscope data, accelerometer data, and on-board diagnostic (OBD) data, and wherein the set of sensors includes at least one of a location sensor, a proximity sensor, a gyroscope sensor, an accelerometer sensor, and an OBD sensor.

3. The method of claim 1, wherein the first image-capturing device is oriented to face inside of each vehicle for capturing inside-vehicle objects and the second image-capturing device is oriented to face outside of each vehicle for capturing outside-vehicle objects.

4. The method of claim 1, wherein the first and second sets of vehicles are associated with the route and a platform facilitated by a vehicle service provider that provides on-demand vehicle services to passengers in a geographical region including the route, and wherein the vehicle is from one of the first and second sets of vehicles.

5. The method of claim 4, wherein each vehicle of the first set of vehicles is owned by a corresponding driver, and wherein each vehicle of the second set of vehicles is owned by the vehicle service provider and is provided to a corresponding driver for operating on the platform facilitated by the vehicle service provider.

6. The method of claim 1, wherein each of the first and second sets of driving-assisting features is further indicative of a proximity distance of each outside-vehicle object with respect to the vehicle, and wherein an outside-vehicle object corresponds to at least one of a pedestrian, an animal, a road-divider, a non-driveable area, a rock, or any other vehicle.

7. The method of claim 6, further comprising determining, by the data processor, a risk score for the vehicle based on at least one of the first, second, third, and fourth sets of driving-assisting features, wherein the warning message is generated when the risk score is greater than a threshold value.

8. The method of claim 1, wherein the warning message is indicative of at least one of a forward collision warning, a headway distance warning, a road condition warning, an accident-prone zone warning, an over speeding warning, or a distracted driver warning.

9. The method of claim 1, further comprising communicating, by the notification generator, the warning message to the driver in real-time, wherein the warning message is communicated to the driver by means of at least one of a text signal, an audio signal, a video signal, or a haptic signal.

10. A system for assisting a driver of a vehicle, the system comprising:
a data collector of a server configured to:
receive, from each vehicle of a plurality of vehicles, sensor data by way of a set of sensors installed in each vehicle, and image data by way of at least first and second image-capturing devices installed with each vehicle, wherein the plurality of vehicles include at least first and second sets of vehicles; and
retrieve, from a first data source, environmental data comprising at least one of meteorological data and road data associated with a route along which the driver is driving the vehicle, and, from a second data source, fleet data comprising at least one of accident data, safety-response-ticket data, and passenger feedback data of each vehicle of the first and second sets of vehicles, and vehicle maintenance data of each vehicle of the second set of vehicles;
a data processor of the server configured to:
process the sensor and image data to generate first and second sets of driving-assisting features, respectively,
wherein the first set of driving-assisting features is indicative of real-time traffic conditions, real-time road conditions, speed-time-distance attributes, braking-and-acceleration frequency, and health conditions of each vehicle, and driving patterns of each driver of each vehicle, and
wherein the second set of driving-assisting features is indicative of vision-based real-time traffic conditions, weather conditions, road conditions, and driving behavior of each driver; and
process the environmental data to generate a third set of driving-assisting features that is indicative of environmental conditions and accident-prone zones of the route, and the fleet data to generate a fourth set of driving-assisting features that is indicative of accident patterns, vehicles' health conditions, drivers' risk profiles, and accident location and time of each accident associated with the route; and
a notification generator of the server configured to:
generate a warning message based on at least one of the first, second, third, and fourth sets of driving-assisting features, to alert the driver of the vehicle in real-time.

11. The system of claim 10, wherein the sensor data includes at least one of location data, proximity data, gyroscope data, accelerometer data, and on-board diagnostic (OBD) data, and wherein the set of sensors includes at least one of a location sensor, a proximity sensor, a gyroscope sensor, an accelerometer sensor, and an OBD sensor.

12. The system of claim 10, wherein the first image-capturing device is oriented to face inside of each vehicle for capturing inside-vehicle objects and the second image-capturing device is oriented to face outside of each vehicle for capturing outside-vehicle objects.

13. The system of claim 10, wherein the first and second sets of vehicles are associated with the route and a platform facilitated by a vehicle service provider that provides on-demand vehicle services to passengers in a geographical region including the route, and wherein the vehicle is from one of the first and second sets of vehicles.

14. The system of claim 13, wherein each vehicle of the first set of vehicles is owned by a corresponding driver, and wherein each vehicle of the second set of vehicles is owned by the vehicle service provider and is provided to a corresponding driver for operating on the platform facilitated by the vehicle service provider.

15. The system of claim 10, wherein each of the first and second sets of driving-assisting features is further indicative of a proximity distance of each outside-vehicle object with respect to the vehicle, and wherein an outside-vehicle object corresponds to at least one of a pedestrian, an animal, a road-divider, a non-driveable area, a rock, or any other vehicle.

16. The system of claim 15, wherein the data processor is further configured to determine a risk score for the vehicle based on at least one of the first, second, third, and fourth sets of driving-assisting features, and wherein the warning message is generated when the risk score is greater than a threshold value.

17. The system of claim 10, wherein the warning message is indicative of at least one of a forward collision warning, a headway distance warning, a road condition warning, an accident-prone zone warning, an over speeding warning, or a distracted driver warning.

18. The system of claim 10, wherein the notification generator is further configured to communicate the warning message to the driver in real-time, and wherein the warning message is communicated to the driver by means of at least one of a text signal, an audio signal, a video signal, or a haptic signal.

19. A vehicle device of a vehicle for assisting a driver of the vehicle traversing on a route, the vehicle device comprising:
    circuitry configured to:
        receive, from each vehicle of a plurality of vehicles, sensor data by way of a set of sensors installed in each vehicle, and image data by way of at least first and second image-capturing devices installed with each vehicle, wherein the plurality of vehicles include at least first and second sets of vehicles;
        process the sensor and image data to generate first and second sets of driving-assisting features, respectively,
            wherein the first set of driving-assisting features is indicative of real-time traffic conditions, real-time road conditions, speed-time-distance attributes, braking-and-acceleration frequency, and health conditions of each vehicle, and driving patterns of each driver of each vehicle, and
            wherein the second set of driving-assisting features is indicative of vision-based real-time traffic conditions, weather conditions, road conditions, and driving behavior of each driver;
        retrieve, from a first data source, environmental data comprising at least one of meteorological data and road data associated with the route along which the driver is driving the vehicle, and, from a second data source, fleet data comprising at least one of accident data, safety-response-ticket data, and passenger feedback data of each vehicle of the first and second sets of vehicles, and vehicle maintenance data of each vehicle of the second set of vehicles;
        process the environmental data to generate a third set of driving-assisting features that is indicative of environmental conditions and accident-prone zones of the route, and the fleet data to generate a fourth set of driving-assisting features that is indicative of accident patterns, vehicles' health conditions, drivers' risk profiles, and accident location and time of each accident associated with the route; and
        generate a warning message based on at least one of the first, second, third, and fourth sets of driving-assisting features, to alert the driver of the vehicle in real-time.

20. The vehicle device of claim 19, wherein the first and second sets of vehicles are associated with a platform facilitated by a vehicle service provider that provides on-demand vehicle services to passengers in a geographical region including the route,
    wherein the vehicle is from one of the first and second sets of vehicles,
    wherein each vehicle of the first set of vehicles is owned by a corresponding driver, and
    wherein each vehicle of the second set of vehicles is owned by the vehicle service provider and is provided to a corresponding driver for operating on the platform facilitated by the vehicle service provider.

* * * * *